United States Patent
Tanimoto et al.

(10) Patent No.: US 6,243,123 B1
(45) Date of Patent: *Jun. 5, 2001

(54) LIGHT BEAM SCANNING APPARATUS FOR USE WITH IMAGE FORMING APPARATUS

(75) Inventors: Koji Tanimoto; Kenichi Komiya, both of Kawasaki; Kunihiko Miura, Hiratsuka; Naoaki Ide, Shizuoka; Jun Sakakibara, Tokyo, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,274

(22) Filed: Aug. 28, 1997

(30) Foreign Application Priority Data

Sep. 3, 1996 (JP) .................................................. 8-233198

(51) Int. Cl.[7] ........................................................ B41J 2/47
(52) U.S. Cl. .............................................. 347/235; 347/250
(58) Field of Search ................................... 347/235, 236, 347/229, 250, 240; 359/211

(56) References Cited

U.S. PATENT DOCUMENTS

| 4,404,571 | * | 9/1983 | Kitamura | 347/235 |
| 4,725,855 | | 2/1988 | Arimoto et al. | 347/250 |
| 4,864,326 | | 9/1989 | Kawamura et al. | 347/240 |
| 5,006,705 | * | 4/1991 | Saito et al. | 347/235 |
| 5,018,808 | | 5/1991 | Meyers et al. | 359/211 |
| 5,541,637 | * | 7/1996 | Ohashi et al. | 347/248 |

FOREIGN PATENT DOCUMENTS

| 36 13 917 | 10/1986 | (DE) . |
| 0 406 844 | 1/1991 | (EP) . |
| 0 446 812 | 9/1991 | (EP) . |
| 3-57452 | 9/1991 | (JP) . |

* cited by examiner

*Primary Examiner*—N. Le
*Assistant Examiner*—Lamson D. Nguyen
(74) *Attorney, Agent, or Firm*—Foley & Lardner

(57) ABSTRACT

In a digital copying machine using a multi-beam optical system, a light beam position detector situated on a line extended from the surface of a photosensitive drum detects the passing position of each light beam scanned by a polygon mirror rotated by a polygon motor. A CPU calculates control amounts for galvanomirrors by using a beam position detector output processor, on the basis of the detection result of the beam position detector. Based on the calculated control amounts, galvanomirror drive circuits drive the galvanomirrors, thereby to control the positions of the beams in a sub-scan direction. The passing positions of the beams can be precisely detected with no special precision in assembling the optical system. In addition, the positions of the beams in the sub-scan direction can be controlled at predetermined positions, even if some change occurs in the structure of the optical system due to a variation in ambience or a variation with the passing of time.

24 Claims, 32 Drawing Sheets

LIGHT BEAM SCANNING APPARATUS FOR USE WITH IMAGE FORMING APPARATUS

BACKGROUND OF THE INVENTION

The present invention relates to a light beam scanning apparatus for simultaneously scanning and exposing a single photosensitive drum with a plurality of laser beams, thereby to form a single electrostatic latent image on the photosensitive drum, and an image forming apparatus such as a digital copying machine or a laser printer using the light beam scanning apparatus.

In recent years, various digital copying machines have been developed in which image formation is performed by scanning and exposing with a laser beam and electronic photographing processing.

More recently, in order to obtain higher image forming speed, developments have been made to a digital copying machine adopting a multi-beam method in which a plurality of laser beams are generated and scanning is simultaneously carried out for a plurality of scanning lines with use of a plurality of beams.

This kind of digital copying machine which adopts such a multi-beam method comprises a plurality of laser oscillators for generating laser beams, a multi-face rotation mirror such as a polygon mirror for reflecting the laser beams generated by the plurality of laser oscillator toward a photosensitive drum to scan the photosensitive drum with the laser beams, and an optical unit serving as a light beam scanning device consisting mainly of a collimator lens and an f-θ lens.

However, in the structure of a conventional optical unit, it is very difficult to obtain an ideal positional relationship between a plurality of light beams on a photosensitive drum (or a surface to be scanned). In order to obtain an ideal positional relationship, respective components as well as assembling thereof require high accuracy, and hence the cost of the device is increased.

Even if an ideal positional relationship is obtained, the shape of a lens may vary slightly or the positional relationship between respective components may vary slightly due to circumferential changes, such as changes in temperature and humidity or time-based changes. Consequently, the positional relationship between light beams varies, and as a result a high quality image cannot be formed. Therefore, to construct this kind of optical system, it is necessary to adopt a structure and components which are strong against changes as described above. In particular, as for lenses, a glass lens which is strong against circumferential changes and time-based changes is expensive so that the cost of the device is increased.

In the following, defects in the multi-beam method, which are caused when an image is formed with light beams whose passing positions are erroneously dislocated, will be explained with reference to FIGS. 32A and 32B and FIGS. 33A and 33B.

For example, in a case where character "T" shown in FIG. 32A is formed, an image as shown in FIG. 32B is formed when a passing position of a light beam is erroneously dislocated from a predetermined position. In the example of this figure, the passing position of a light beam b is shifted from its predetermined position so that the distance between light beam a and b is reduced while the distance between light beam b and c is increased, among four light beams a and d used. In other words, the dot interval changes in the sub-scanning direction.

FIG. 33A shows an example of an image in which emission timings of respective light beams are not controlled correctly. As is apparent from this figure, the image forming position in the main scanning direction is dislocated so that a longitudinal line cannot be formed straight. That is, the dots are shifted from each other in the main scanning direction.

FIG. 33B shows an image in which neither the passing positions of light beams not the emission timings are controlled correctly, defects in an image appear both in the sub-scanning direction and in the main scanning direction.

Thus, when an image is formed in a multi-beam method, light beam passing positions in the sub-scanning direction must be controlled so as to be arranged at predetermined intervals, and the emission timings of respective light beams must be controlled so as to align the image forming position in the main scanning direction.

BRIEF SUMMARY OF THE INVENTION

An object of the present invention is to provide a light beam scanning apparatus and an image forming apparatus using the light beam scanning apparatus, wherein the passing position of the beam can be precisely detected with no special precision in assembling a optical system, and the position of the beam can be controlled at a predetermined position, even if some change occurs in the structure of the optical system due to a variation in ambience or a variation with the passing of time.

Another object of the invention is to provide a light beam scanning apparatus and an image forming apparatus using the light beam scanning apparatus, wherein even in a case where plural light beams are used, the passing positions of the beams can be precisely detected with no special precision in assembling a optical system, and the positional relationship among the beams on a scan surface to be scanned can be controlled in an ideal condition at all times.

In order to achieve the above object, according to one aspect of the present invention, there is provided a light beam scan apparatus comprising: light beam generating means for generating a light beam; scan means for reflecting the light beam, generated by the light beam generating means, to a scan surface to be scanned, and for scanning the scan surface in a main scan direction and a sub-scan direction by means of the light beam; a plurality of light detection means (SB to SF), arranged near the scan surface in the sub-scan direction, for receiving the light beam and outputting a corresponding signal; position determination means for determining, on the basis of the signal output from the light detection means, the position in the sub-scan direction of the light beam scanned by the scan means; and control means for controlling the position in the sub-scan direction of the light beam scanned by the scan means on the scan surface at a predetermined position, on the basis of the determination result of the position determination means.

In general, a plurality of light detection means, provided in a light beam scanning apparatus, for confirming a beam scan position are arranged at an angle to a sub-scan direction. In the present invention, however, the plural light detection means are linearly arranged in the sub-scan direction at intervals of, e.g. 42.3 μm. Thus, the light detection means can be assembled in such an apparatus with a beam scanning apparatus, as an image forming apparatus, with no special precision. The passing position of the beam can be precisely detected, and the position of the beam can be controlled at a predetermined position, even if some change occurs in the structure of the optical system due to a variation in ambience or a variation with the passing of time.

Besides, the plurality of light detection means comprise a plurality of first light detection means arranged at regular intervals in the sub-scan direction of the light beam, and two second light detection means arranged outside both ends of the first light detection means in the sub-scan direction. Each of the second light detection means is much greater in size than each of the first light detection means. The second light detection means is provided to detect the beam position, even when the position of the beam in the sub-scan direction deviates greatly from its normal position.

According to another aspect of the present invention, there is provided a light beam scanning apparatus according wherein a plurality of the light beam generating means are provided, and the scan means includes means for reflecting the light beams, generated by the plural light beam generating means, to the scan surface, and for scanning the scan surface in the main scan direction and sub-scan direction by means of the light beams. Middle positions between adjacent two of the light detection means coincide with target positions of the light beams in the sub-scan direction. This apparatus further includes selection means for selecting one of the light beam generating means and causing the selected one to emit one light beam. The control means includes means for controlling the scan means such that the light beams scanned by the scan means pass over the target positions, on the basis of the determination result of the position determination means.

Specifically, the light beam scanning apparatus of the present invention is applied to such an apparatus with a multi-beam optical system, as a printer, and the position of each beam in the sub-scan direction can be controlled. The error in beam position can be reduced to, e.g. 1 $\mu$m.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, servo to explain the principles of the invention.

FIG. 14 is a flow chart illustrating the general operation of a printer unit at the time of switch-on;

DETAILED DESCRIPTION OF THE INVENTION

An embodiment of the present invention will now be described with reference to the accompanying drawings.

Figure 1:
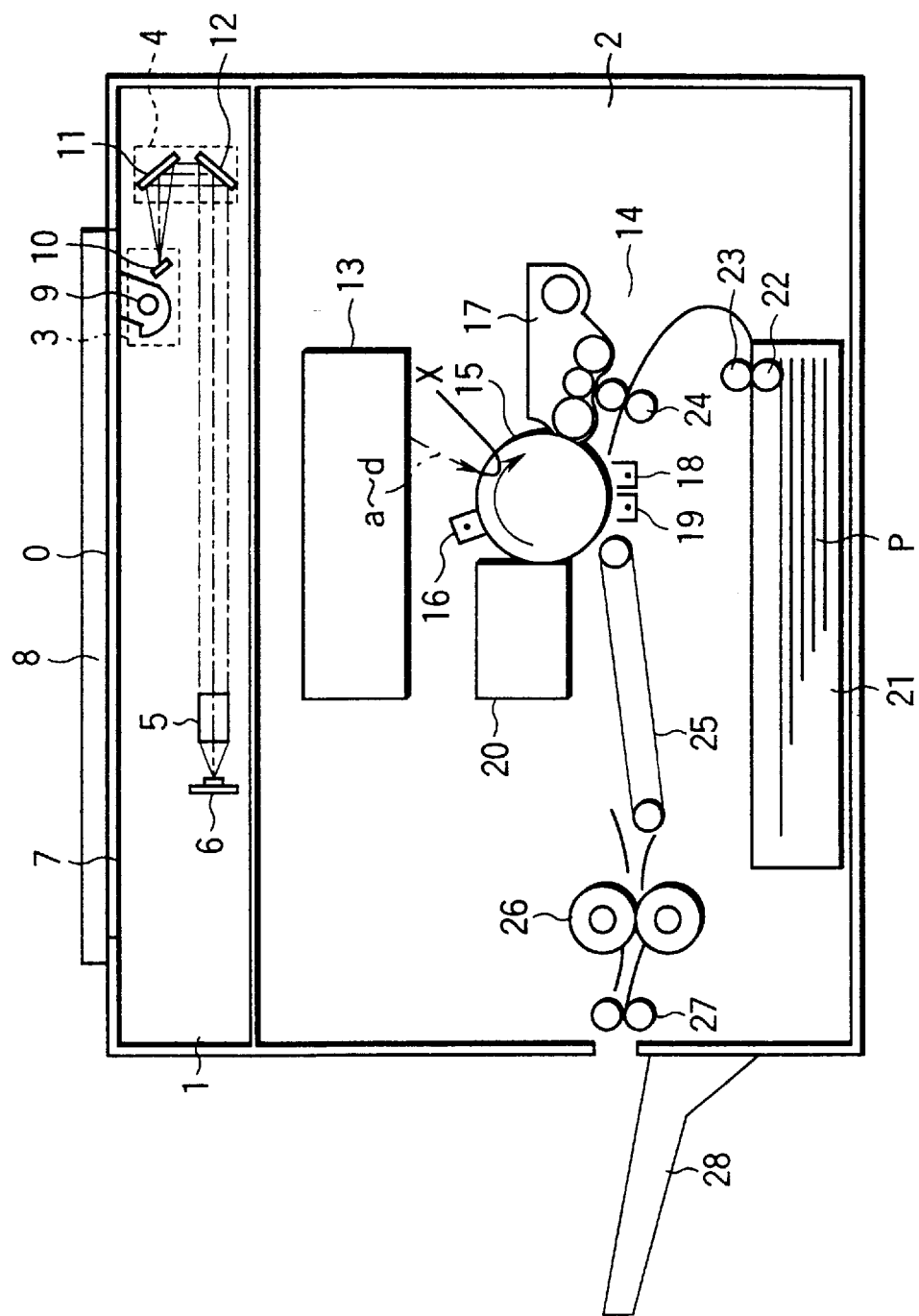
FIG. 1 schematically shows the structure of a digital copying machine according to an embodiment of the present invention.

FIG. 1 shows the structure of a digital copying machine as an image forming apparatus which adopts a light beam scanning device according to an embodiment of the present invention. Specifically, this digital copying machine comprises a scanner section 1 or image reading means and a printer section 2 or image forming means. The scanner section 1 comprises a first carriage 3 and a second carriage 4 which are movable in the arrow direction in the figure, an image lens 5, and a photoelectric conversion element 6.

In FIG. 1, an original O is placed on an original mount 7 made of transparent glass such that the original faces downwards. The original O aligned with a mount index which is the center of the shorter side of the original mount 7 in the right-hand side in the figure is pressed against the original mount 7 by an openable fixing cover 8.

The original O is illuminated by a light source 9 and the reflection light therefrom is converged onto a light receiving surface of the photoelectric conversion element 6, by mirrors 10, 11 and 12 and an imaging lens 5. The first carriage 3 equipped with the light source 9 and the mirror 10 and the second carriage 4 equipped with the mirrors 11 and 12 are moved at a relative speed of 2:1 such that the length of the light path is maintained to be constant. The first and second carriages 3 and 4 are moved by a carriage drive motor (not shown) from the right-hand side to the left-hand side in synchronization with a read timing signal.

As has been described above, an image of the original O placed on the original mount 7 is sequentially read in units of a line by the scanner section 1. An output obtained by thus reading the image is converted to 8-bit digital image signals representing gradation of the image by an image processing section (not shown).

The printer section 2 comprises an optical unit 13 and an image forming section 14 adopting an electronic photographing method in which an image can be formed on a paper sheet P as a medium on which an image is formed. Specifically, image signals read out from the original O by the scanner section 1 are processed by the image processing section (not shown), and thereafter are converted into laser beams (hereinafter referred to as simply "light beams") from semiconductor laser oscillators.

Although the structure of the optical unit 13 will be specifically described later, a plurality of semiconductor laser oscillators provided in the unit carry out emission operation in accordance with laser modulation signals output from the image processing section (not shown). The light beams output from the oscillators are reflected by a polygon mirror to form scanning light beams which are output to the outside of the unit.

A plurality of light beams output from the optical unit 13 are imaged as spotted scanning light beams having a resolution necessary for an exposure position X on a photosensitive drum 15 as an image carrying member, and thus scanning and exposing are performed. As a result of this, an electrostatic latent image is formed on the photosensitive drum 15 in accordance with image signals.

In the periphery of the photosensitive drum 15, there are provided an electric charger 16 for electrically charging the surface of the drum, a developer device 17, a transfer charger 18, a separation charger, a cleaner 20, and the like. The photosensitive drum 15 is rotated at a predetermined circumferential speed by a drive motor (not shown), and is electrically charged by the electric charger 16 provided so as to face the surface of the drum. A plurality of light beams (or scanning light beams) are spotted on an exposure position X on the charged photosensitive drum 15, thereby forming an image.

An electrostatic latent image formed on the photosensitive drum 15 is developed with toner (or developer) supplied from the developer device 17. A toner image formed on the photosensitive drum 15 by developing is transferred by the transfer charger 18 at a transfer position onto a paper sheet P fed from a sheet supply system at a certain timing.

The sheet supply system sequentially supplies paper sheets P in a sheet supply cassette 21 provided at a bottom position, while the sheets P are being separated from one another by a sheet supply roller 22 and a separation roller 24, and is fed to a transfer position at a predetermined timing. In the downstream side of the transfer charger 18, there are provided a sheet conveyer mechanism 25, a fixing device 26, and delivery rollers 27 for discharging the sheets P with the formed images. Therefore, a paper sheet P on which a toner image has been transferred is fed out onto an external sheet supply tray 28 through the delivery rollers 27, after the toner image is fixed by the fixing device 26.

A cleaner 20 removes toner remaining on the surface of the photosensitive drum 15 from which a toner image has been transferred onto a paper sheet P, and the drum thereby recovers an initial condition in a stand-by condition.

Image forming operation is continuously performed by repeating the processing operation as described above.

As has been described above, data is read out from the original O placed on the original mount 7 by the scanner section 1, and the data thus read is subjected to a series of processing at a printer section 2. Thereafter, the data is recorded as a toner image on the paper sheet P.

The optical unit 13 will now be described.

Figure 2:
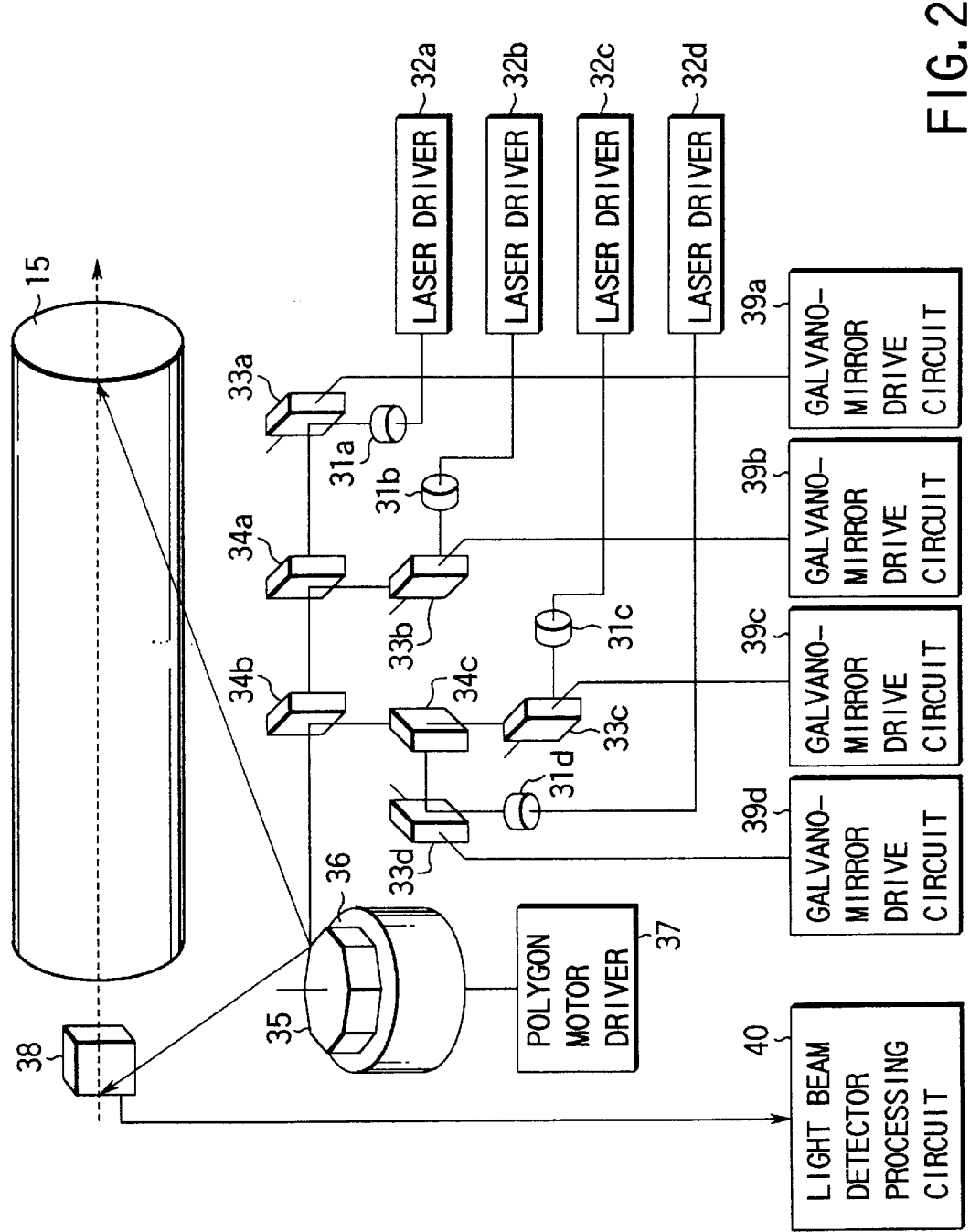
FIG. 2 shows a positional relationship between the structure of an optical system unit and a photosensitive drum.

FIG. 2 shows the structure of the optical unit 13 and the positional relationship between the unit 13 and the photosensitive drum 15. The optical unit 13 includes, for example, four semiconductor laser oscillators 31a, 31b, 31c and 31d, and each of the oscillators performs image formation for one scanning line at the same time, so that high speed image formation is realized without extremely increasing the rotation speed of the polygon mirror.

The laser oscillator 31a is driven by a laser driver 32a. A light beam output from therefrom passes through a collimator lens (not shown) and thereafter strikes on a galvanomirror 33a. The light beam reflected by the galvanomirror 33a passes through half-mirrors 34a and 34b and falls on a polygon mirror 35 serving as rotational polygonal mirror.

The polygon mirror 35 is rotated at a constant speed by a polygon motor 36 driven by a polygon motor driver 37. In this manner, the light beam reflected by the polygon mirror 35 swings such that scanning is performed in a constant direction at an angle speed depending on the rotation speed of the polygon motor 36. The scanning light beam swung by the polygon mirror 35 passes through an f-θ lens, thereby scanning the light receiving surface of a light beam position detector 38, which serves as light beam passing position detector means, and the photosensitive drum 15, owing to the f-θ characteristics of the f-θ lens.

The laser oscillator 31b is driven by a laser driver 32b. A light beam outputted therefrom passes through a collimator lens (not shown) and is thereafter reflected by a galvanomirror 33b and further by an half-mirror 34a. The light beam reflected by the half-mirror 34a passes through an half-mirror 34b and strikes on the polygon mirror 35. The route of the light beam after the polygon mirror 35 is the same as that of the beam from the laser oscillator 31a, i.e. the light beam passes through an f-θ lens (not shown), thereby scanning the light receiving surface of the light beam position detector 38 and the photosensitive drum 15.

The laser oscillator 31c is driven by a laser driver 32c. A light beam outputted therefrom passes through a collimator lens and is thereafter reflected by a galvanomirror 33c. The light beam further passes through a half-mirror 34c, is reflected by a half-mirror 34b, and then falls on the polygon mirror 35. The route of the light beam after the polygon mirror 35 is the same as that of the beams of the laser oscillators 31a and 31b, i.e. the light beam passes through an f-θ lens, thereby scanning the light receiving surface of the light beam position detector 38 and the photosensitive drum 15.

The laser oscillator 31d is driven by a laser driver 32d. A light beam outputted therefrom passes through a collimator lens (not shown) and is thereafter reflected by a galvanomirror 33d. The light beam is further reflected by half-mirrors 34c and 34b, and falls on the polygon mirror 35. The route of the light beam after the polygon mirror 35 is the same as that of the beams of the laser oscillators 31a, 31b and 31c, i.e. the light beam passes through an f-θ lens (not shown), thereby scanning the light receiving surface of the light beam position detector 38 and the photosensitive drum 15.

Thus, light beams outputted from individual laser oscillators 31a, 31b, 31c and 31d are synthesized by half-mirrors 34a, 34b and 34c so that four light beams travel in the direction toward the polygon mirror 35.

Therefore, the photosensitive drum 15 can be simultaneously scanned with four light beams so that an image can be recorded at a speed four times higher than in a conventional single light beam on condition that the polygon mirror 35 is rotated at an equal rotation speed.

The galvanomirrors 33a, 33b, 33c and 33d are used to adjust (or control) the positional relationship between light beams in the sub-scanning direction, and are respectively connected to galvanomirror drive circuits 39a, 39b, 39c and 39d.

The light beam position detector 38 serves to detect passing positions and passing timings of four light beams, and is provided near an end portion of the photosensitive drum 15 such that the light receiving surface of the detector 38 is situated at a level equal to the surface of the photosensitive drum 15. On the basis of a detection signal from the light beam position detector 38, control of the galvanomirrors 33a to 33d (i.e. control of image forming positions in the sub-scanning direction), control of emission power (i.e. intensity) of the laser oscillators 31a to 31d, as well as control of emission timings (i.e., control of image forming positions in the main scanning direction) are respectively performed in accordance with the light beams, although the details of the control will be described later. The light beam position detector 38 is connected to a light beam detector processing circuit 40, in order to generate signals for performing the control as described above.

The beam position detector 38 will now be described.

Figure 3:
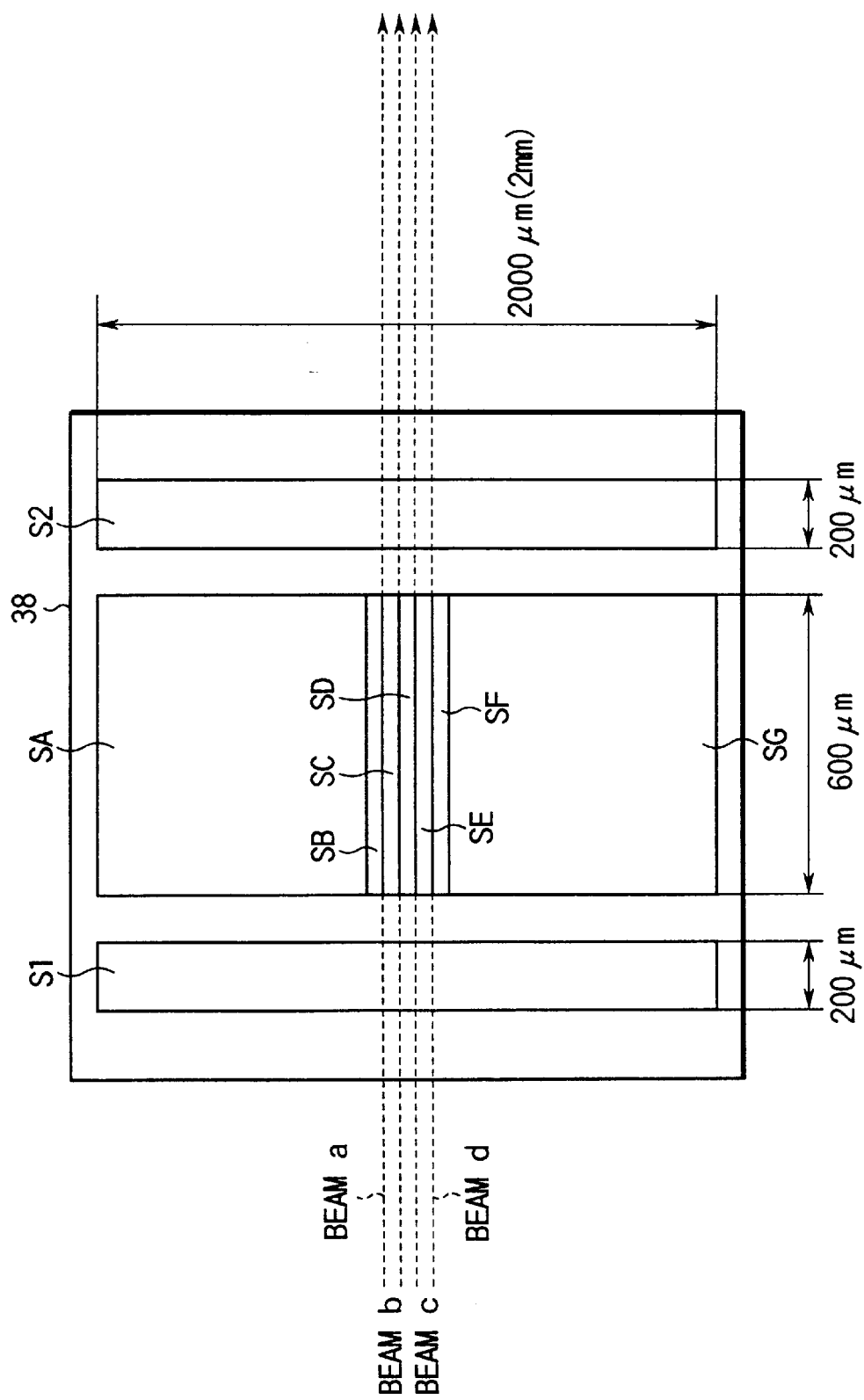
FIG. 3 schematically shows the structure of a light beam position detector.

FIG. 3 shows the relationship between the structure of the beam position detector 38 and the scanning direction of the light beams. The beams from the four laser oscillators 31a to 31d are made to scan from the left to the right by the rotation of the polygon mirror 35, thus crossing the beam sensor 38.

The light beam position detector 38 has elongated patterns S1 and S2, as well as sensor (light reception) patterns SA, SB, SC, SD, SE, SF and SG interposed between the patterns S1 and S2.

As is shown in FIG. 3, the sensor patterns S1 and S2 are elongated in a direction (sub-scan direction) perpendicular to the main scan direction so that the light beam made to scan by the polygon mirror 35 may cross the sensor patterns S1 and S2 without fail, irrespective of the angles of the galvanomirrors 33a to 33d. For example, in this embodiment, the dimension of each sensor pattern S1, S2 in the beam scan direction is 200 μm while the dimension thereof in the beam sub-scan direction is 2000 μm.

The sensor patterns SA to SG, as shown in FIG. 3, are arranged in a stacking fashion between the sensor patterns S1 and S2. The dimension of these sensor patterns in the beam scan direction is 600 μm, and small gaps are provided among the sensor patterns.

Figure 4:
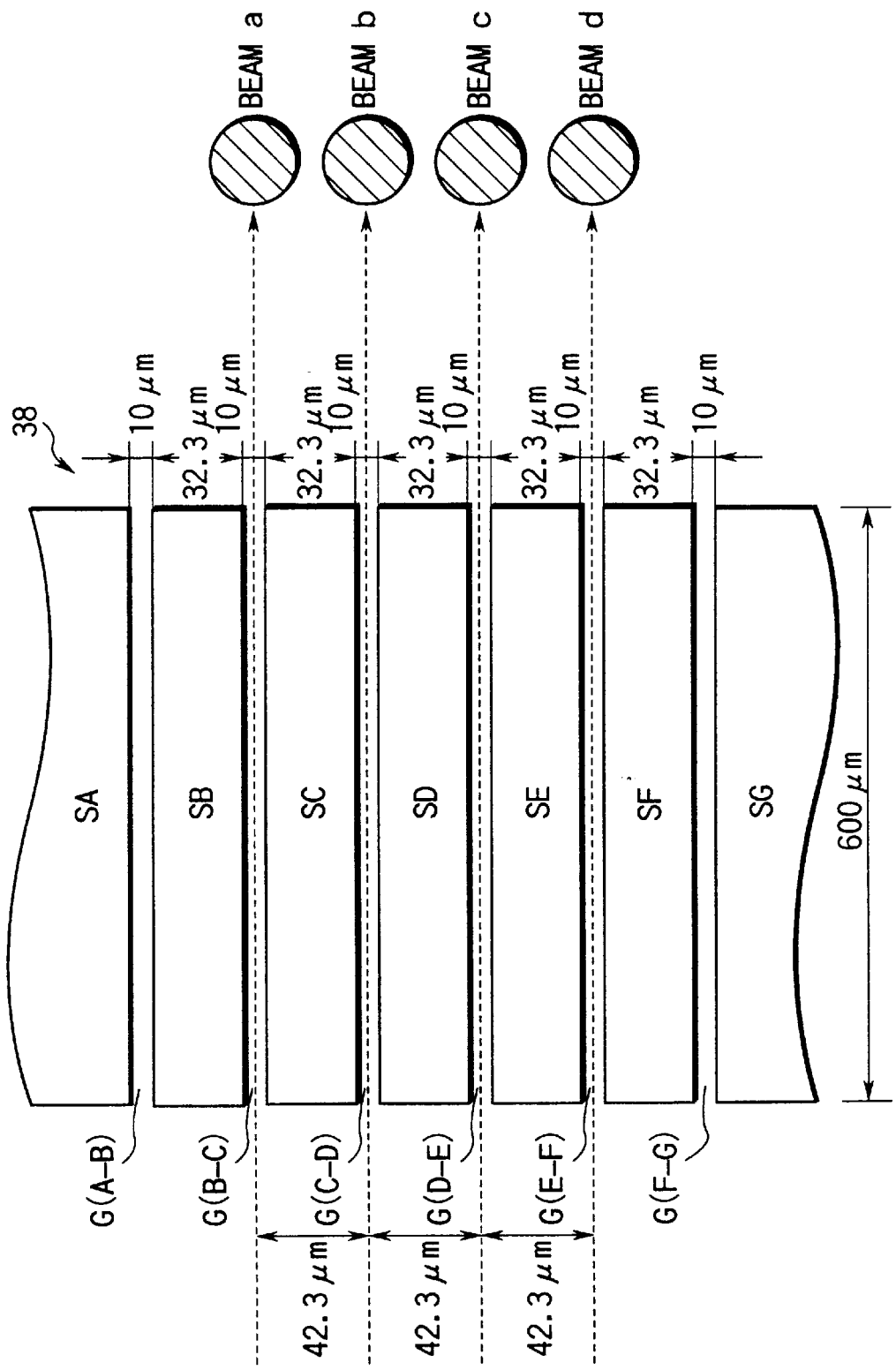
FIG 4 schematically shows sensor patterns of the light beam position detector.

FIG. 4 is an enlarged view of the sensor patterns SA to SG of the beam position detectors.

The sensor patterns SB to SF are patterns for adjusting the pitch of light beams. The sensor patterns SB to SF have rectangular pattern shapes of, e.g. 32.3×600 μm, and small gaps of 10 μm are provided in the beam sub-scan direction. Accordingly, the pitch between the gaps is 42.3 μm. In addition, the gap between the sensor patterns SA and SB and between the sensor patterns SF and SG is set at 10 μm.

A control operation using the output of the beam position sensor 38 will be described later in detail. It should be noted, however, that the gaps provided at the pitch of 42.3 μm serve as targets for setting the passing positions of beams a to d at a predetermined pitch (42.3 μm in this embodiment). Specifically, the gap G (B-C) defined by sensor patterns SB and SC serves as the target for the passing position of the beam a; the gap G (C-D) defined by sensor patterns SC and SD serves as the target for the passing position of the beam b; the gap G (D-E) defined by sensor patterns SD and SC serves as the target for the passing position of the beam c; and the gap G (E-F) defined by sensor patterns SE and SF serves as the target for the passing position of the beam d.

The features of the beam position detector 38 having the above-described sensor patterns will now be described with reference to FIGS. 5A and 5B.

As has been described above, the beam position detector 38 is situated near the end portion of photosensitive drum 15 or at the position where the beam reflected by the polygon mirror 35 is radiated, such that the light reception surface of the detector 38 is situated on an axis extended from the surface of the photosensitive drum 15. In order to exactly detect the passing positions of beams by means of the beam position detector 38 situated as described above, it is necessary that the respective sizes of the sensor patterns are aligned perpendicular or parallel to the beam passing direction. However, the beam position detector 38 is actually mounted at some inclination to the ideal position.

To solve this problem, in the beam position detector 38 of this invention, the sensor patterns are arranged such that detection points for detecting the beam passing positions are aligned in the beam sub-scan direction. Thereby, even if the beam position detector 38 is mounted at some inclination, the error in detection pitch can be limited to a minimum.

Furthermore, an integration circuit is added to a circuit for processing the output of the beam position detector 38, though this will be described later in detail. Thus, even if the beam position detector 38 is inclined, the influence on the detection result of the beam passing positions can be limited to a minimum.

The length of each of the sensor patterns SA and SG in the beam sub-scan direction is much greater than that of each of the sensor patterns SB to SF. In this embodiment, the length of the sensor pattern SA, SG in the sub-scan direction is more than 20 times greater than the pitch (42.3 μm) of the sensor patterns SB to SF. The reason is that the sensor patterns SB to SF are used to set the beam passing position within 1 μm from the target position while the sensor patterns SA and SG are used to generally determine the beam passing position.

Figure 5A:
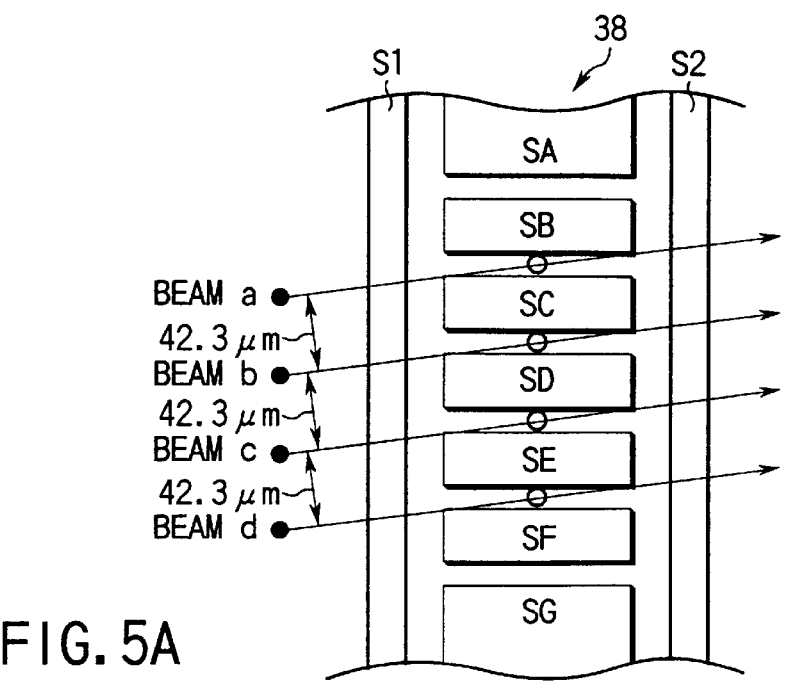
FIGS. 5A and 5B illustrate inclinations of the light beam scan directions with respect to the light beam position detectors.

FIG. 5A shows the relationship between the sensor patterns and the beam passing positions in the case where the beam position detector 38 of the present invention is situated with an inclination to the beam scan direction. In FIG. 5A, however, this relationship is shown as if the beam scan direction is inclined. The scan lines of beams a to d are controlled at ideal intervals (pitch=42.3 µm).

Control target points (indicated by circles in white) are set among the sensor patterns. The target points, as will be described later in detail, remain at the centers among the patterns even when the beams are made incident at an angle, by virtue of the advantages of integration circuits.

As is clear from FIG. 5A, the loci of scan lines controlled at ideal intervals (pitch=42.3 µm) pass through substantially the central points of control targets on the sensor patterns. In other words, even when the beam position detector 38 is mounted at a small angle, the influence on the detection precision is very small.

For example, when the beam position detector 38 is mounted at an angle of 5° to the beam scan lines, the beam scan position pitch, which is normally to be set at 42.3 µm, is set at 42.14 µm in consideration of a detection error of the beam position detector 38 due to the inclination. In this case, the error is about 0.16 µm (0.38%). If the pitch is controlled in this manner, the influence on the image quality is very small. Although not described in detail, the value of the pitch can be easily calculated by using a trigonometric function.

If the sensor patterns of the beam position detector 38 of the present invention is used, the beam scan positions can be exactly detected even if the beam position detector 38 is mounted with a slight inclination.

Figure 5B:
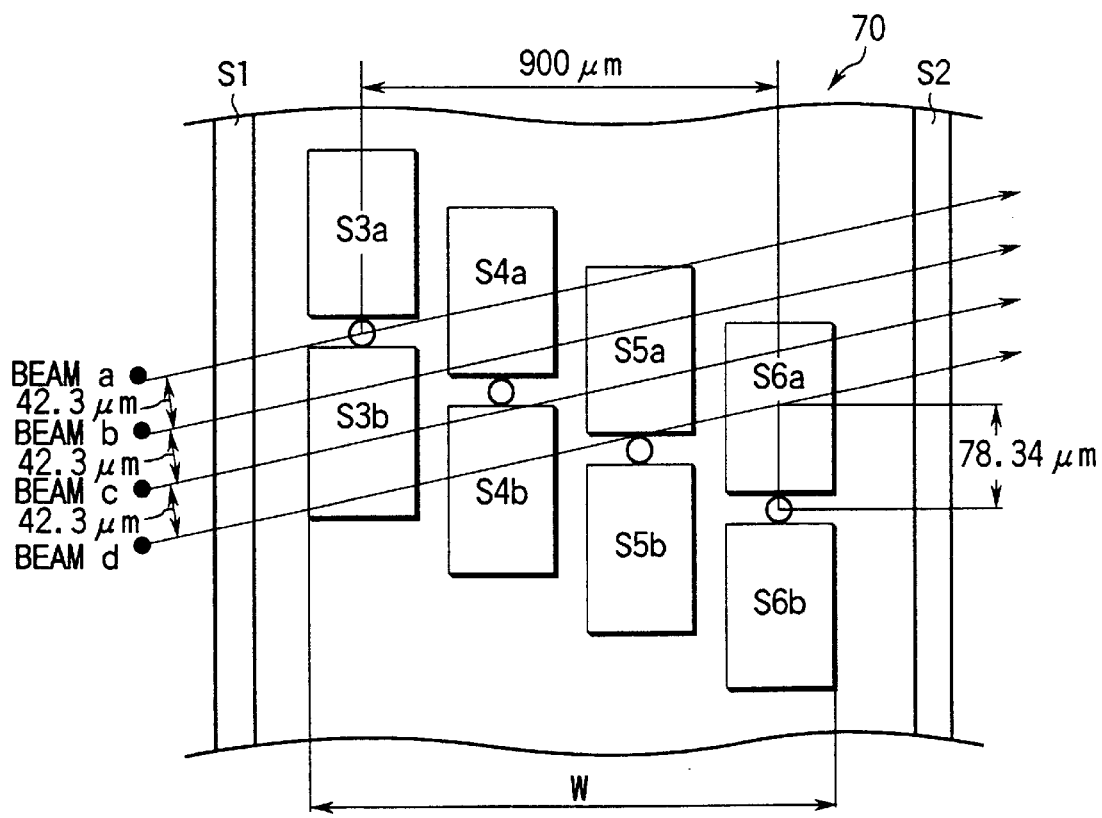

FIG. 5B shows an example of the conventional sensor patterns of a beam position detector 70 for achieving the same function as the beam position detector 38 of this invention.

In the case where such conventional sensor patterns are adopted, the beam passing positions cannot exactly be detected if the sensor patterns are slightly inclined with respect to the beam scan directions. The reason is that the sensor patterns (S3*, S4*, S5*, S6*: *=a and b) for detecting the beam passing positions are arranged at a distance in the beam scan direction. The greater the distance between the sensor patterns in the beam scan direction, the greater the detection error for a sensor pattern.

FIG. 5B, like FIG. 5A, shows loci of scan lines controlled at ideal intervals (pitch=42.3 µm), on the assumption that the beam position detector 38 is mounted with an inclination. As is obvious from FIG. 5B, the conventional beam position detector 70 requires much higher precision in mounting position than the beam position detector 38 of this invention as shown in FIG. 5A.

Suppose that the beam position detector 70 shown in FIG. 5B, like the beam position detector 38 shown in FIG. 5A, is mounted with an inclination of 5° and the distance between the sensor patterns S3a and S3b, on the one hand, and the sensor patterns S6A and S6b, on the other, is 900 µm. In this case, the control target point of the beam d is dislocated from the ideal position by 78.34 µm. This value is much greater than the target control pitch of 42.3 µm and adversely affects the image quality very seriously. In the case where the beam position detector 70 is used, very high sensor mounting precision is required at least with respect to the inclination to the beam scan direction.

In order to solve this problem in the prior art, it is necessary to reduce the sensor pattern width (W) in the beam scan direction as much as possible and locate the beam passing position detection points as close as possible in the beam scan direction, even though the sensitivity of the sensor is sacrificed to some extent. Furthermore, in order to compensate the deficiency in sensitivity of the sensor, it is necessary to increase the power of the laser oscillator or decrease the rotation speed of the polygon motor at the time of detecting the beam passing positions.

The control system of this invention will now be described.

Figure 6:
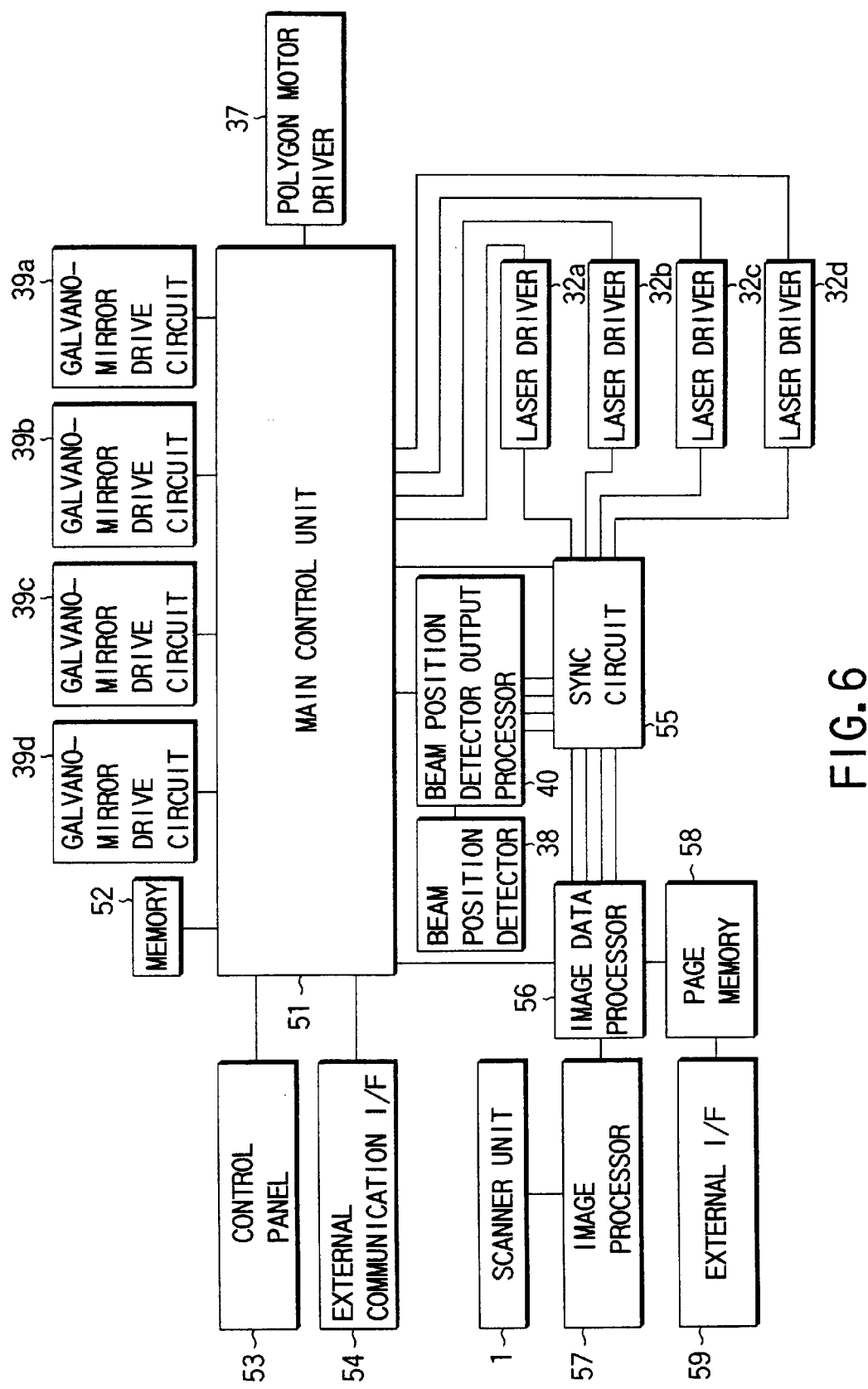
FIG. 6 is a block diagram showing a control system relating mainly to the control of the optical system.

FIG. 6 shows the structure of the control system mainly for the multi-beam optical system in the digital copying machine. A main control unit 51 performs the general control of the optical unit and comprises, for example, a CPU (central processing unit). The main control unit 51 is connected to a memory 52, a control panel 53, an external communication interface (I/F) 54, laser drivers 32a to 32d, a polygon mirror motor driver 37, galvanomirror drive circuits 39a to 39d, a beam position detector output processor 40, a sync circuit 55 and an image data interface (I/F) 56.

The sync circuit 55 is connected to the image data I/F 56. The image data I/F 56 is connected to an image processor 57 and a page memory 58. The image processor 57 is connected to a scanner unit 1. The page memory 58 is connected to an external interface (I/F) 59.

The flow of image data at the image formation will now be described in brief.

In the copying operation mode, as described above, the image on the original O set on the original mount 7 is read by the scanner unit 1 and sent to the image processor 57. In the image processor 57, the image signal from the scanner unit 1 is subjected to, for example, well-known shading correction, filtering processes, gray scale processing, gamma correction, etc.

The image data from the image processor 57 is delivered to the image data I/F 56. The image data I/F 56 distributes the image data to the four laser drivers 32a to 32d. The sync circuit 55 generates clocks in synchronism with the timing of the light beams passing over the beam position detector 38. In synchronism with the clocks, the image data is supplied from the image data I/F 56 as laser modulation signals to the laser drivers 32a to 32d. Since the image data is transferred in synchronism with the scanning of the beams, the image formation can be performed in correct synchronism (at correct positions) in the scan direction.

The sync circuit 55 includes a sample timer and a logic circuit. The sample timer controls the power of each beam by forcibly activating the laser oscillators 31a to 31d in non-image areas. The logic circuit activates the laser oscillators 31a to 31d on the beam position detector 38 according to the order of the beams, thereby to establish the image formation timing of the beams.

The control panel 53 is a man-machine interface for starting the copying operation, setting the number of copies, etc.

The present digital copying machine can perform not only the copying operation but also the image formation of image data input from the outside via the external I/F 59 connected to the page memory 58. The image data input from the external I/F 59 is temporarily stored in the page memory 58 and then delivered to the sync circuit 55 via the image data I/F 56.

When the digital copying machine is externally controlled by means of a network, etc., the external communication I/F 54 serves as control panel 53.

The galvanomirror drive circuits 39a to 39d drive the galvanomirrors 33a to 33d in accordance with instruction values generated from the main control unit 51. Thus, the main control unit 51 can freely control the angles of the galvanomirror 33a to 33d by using the galvanomirror drive circuits 39a to 39d.

The polygon motor driver 37 drives the polygon motor 36 for rotating the polygon mirror 35 for causing the above-mentioned four light beams to scan. The main control unit 51 can instruct the polygon motor driver 37 to start/stop and switch the rotation speed of the polygon motor 36. The rotation speed of the polygon motor 36 is made lower than a predetermined value, where necessary, in order to confirm the passing positions of the beams by means of the beam position detector 38.

The laser drivers 32a to 32d, as mentioned above, produce laser beams in accordance with the laser modulation signals synchronized with the beam scanning generated from the sync circuit 55. In addition, the laser drivers 32a to 32d, upon receiving forcible emission signals from the main control unit 51, activate the laser oscillators 31a to 31d, irrespective of the image data.

The main control unit 51 sets, by means of the laser drivers 32a to 32d, the light emission power of the laser oscillators 31a to 31d. The light emission power is varied in accordance with a change in process conditions or detection results of the beam passing positions.

The memory 52 stores information necessary for the control operations. For example, the memory 52 stores data on the control of galvanomirrors 33a to 33d and on the order of incoming light beams. Thereby, the optical unit 13 can be immediately set in the image formation state, after the power is tuned on.

The beam passing (scanning) position control will now be described in detail.

Figure 7:
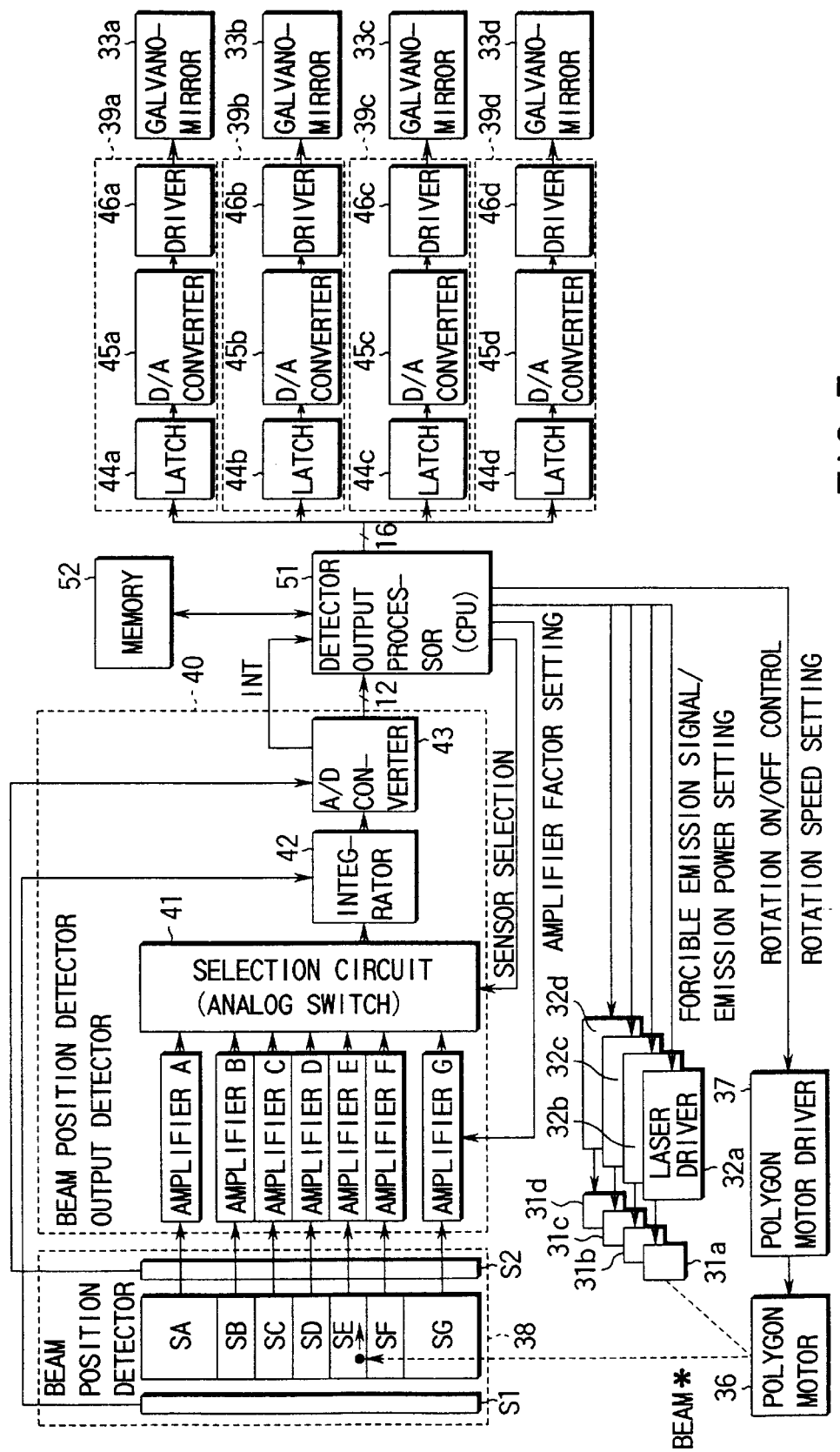
FIG. 7 is a clock diagram for describing a light beam passing position control.

FIG. 7 shows the relationship among the beam position detector 38 for controlling the beam passing positions, beam position detector output processor 40, main control unit 51, galvanomirror drive circuits 39a to 39d, galvanomirrors 33a to 33d, laser drivers 32a to 32d, polygon motor driver 37 and polygon motor 36.

As has been described above, pulse signals indicating the passing of beams are produced from the sensor patterns S1 and S2. In addition, signals corresponding to the beam passing positions are produced independently from the sensor patterns SA to SG.

As is shown in FIG. 7, the independent signals from the sensor patterns SA to SG are input to and amplified by amplifiers A to G. The amplification factors are designated by the CPU built in the main control unit 51.

The amplified output signals from the sensor patterns SA to SG are input to a selection circuit (analog switch) 41. The selection circuit 41 selects a signal to be input to an integrator 42 in accordance with an instruction from the main control unit (or CPU) 51. The sensor pattern output selected by the selection circuit 41 is input to and integrated by the integrator 42.

On the other hand, a pulse signal from the sensor pattern S1 is also input to the integrator 42. The pulse signal from the sensor pattern S1 resets the integrator 42. When the input of this pulse signal is completed, the integrator 42 is permitted to start a new integration operation. Although described later in detail, the integrator 42 has functions of removing noise and eliminating an influence of inclination in mounting position of the beam position detector 38.

An output from the integrator 42 is input to an A/D converter 43. The A/D conversion operation of the A/D converter 43 is started by the pulse signal from the sensor pattern S2. Specifically, the A/D conversion operation is started at the timing at which the beam passes through the sensor pattern S2.

As has been described above, the integrator 42 is reset by the pulse signal from the sensor pattern S1 immediately before the light beams have passed over the sensor patterns SA to SG for detecting the beam passing positions, and at the same time the integration operation is started. While the beams are passing over the sensor patterns (SA to SG) for sensing the beam passing positions, the integrator 42 integrates signals indicating the beam passing positions. Immediately after the beams have passed over the sensor patterns (SA to SG), the integration result of the integrator 42 is A/D converted by the A/D converter 43, with the pulse signal from the sensor pattern S2 supplied as a trigger signal. Thus, the noise-free sensor signal, from which the influence of the inclination in mounting position of the beam position detector 38 has been eliminated, can be converted to a digital signal.

The A/D converter 43, which has completed the A/D conversion, outputs an interrupt signal (INT) indicating the completion of the A/D conversion process to the main control unit 51.

Thus, the digitally converted beam position detection signal from the beam position detector 38 is input to the CPU of the main control unit 51, thereby determining the passing position of the beam.

On the basis of the beam position detection signal, the main control unit 51 calculates control amounts for the galvanomirrors 33a to 33d, and the calculated results are stored in the memory 52, where necessary. The main control unit 51 delivers the calculated results to the galvanomirror drive circuits 39a to 39d.

As is shown in FIG. 7, the galvanomirror drive circuits 39a to 39d are provided with latches 44a to 44d for holding the data of the calculated results. On the data is written in the latches 44a to 44d by the main control unit 51, the latches 44a to 44d maintain the data until the data is updated. The data held in the latches 44a to 44d is converted to analog signals (voltage)by D/A converters 45a to 45d and input to drivers 46a to 46d for driving the galvanomirror 33a to 33d. The drivers 46a to 46d drive the galvanomirror 33a to 33d in accordance with the analog signals (voltage) input from the D/A converters 45a to 45d.

In the present embodiment, only one of the amplified output signals from the sensor patterns SA to SG is selected by the selection circuit (analog switch) 41 and integrated, and the integrated output is A/D converted. Thus, all output signals from the sensor patterns SA to SG cannot be input to the main control unit 51 at the same time. Consequently, in a state in which the passing positions of the beams are not specified, it is necessary to successively operate the analog switch (selection circuit) 41 and supply the output signals from all the sensor patterns SA to SG to the main control unit 51, thereby to determine the passing positions of the beams.

However, once the passing positions of the beams have been recognized, the passing positions of the beams can be estimated unless the galvanomirror (33a to 34d) are excessively moved. Therefore, there is no need to input the output signals from all sensor patterns to the main control unit (CPU) 51. This process will be described later in detail with reference to flow charts.

Figure 8:
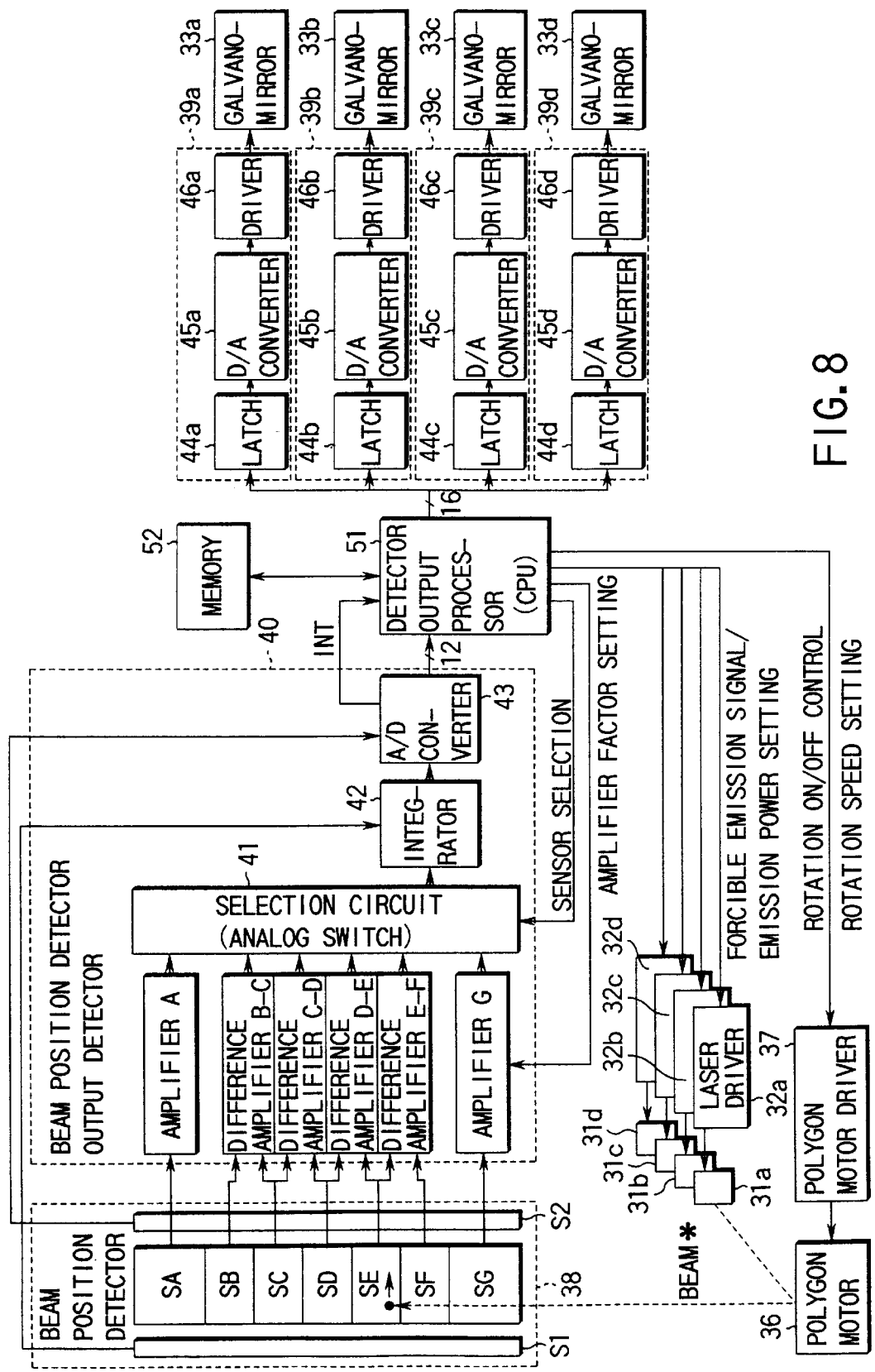
FIG. 8 is a clock diagram for describing the light beam passing position control.

FIG. 8 shows an example using, in place of the differential amplifiers for amplifying differences between output signals from adjacent two of the sensor patterns SB to SF. As is shown in FIG. 8, output signals from sensor patterns SB and SC are supplied to a differential amplifier B-C; output signals from sensor patterns SC and SD are supplied to a differential amplifier C-D; output signals from sensor patterns SD and SE are supplied to a differential amplifier D-E; and output signals from sensor patterns SE-SF are supplied to a differential amplifier E-F. These differential amplifiers amplify the differences between the input signals.

Outputs from these differential amplifiers (B-C, C-D, D-E and E-F) are input to the selection circuit (analog switch) 41, as in the preceding example. The flow of the signals from the selection circuit 41 is the same as in the example shown in FIG. 7.

Figure 9A:
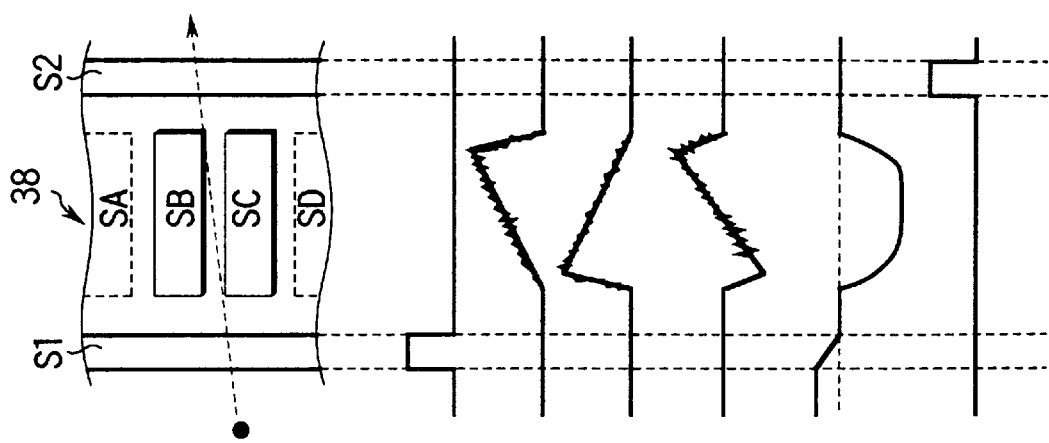
FIGS. 9A to 9C show relationships between light beam passing positions and outputs of reception light patterns of a light beam position sensor, outputs of a differential amplifier and an output of an integrator.
Figure 9B:
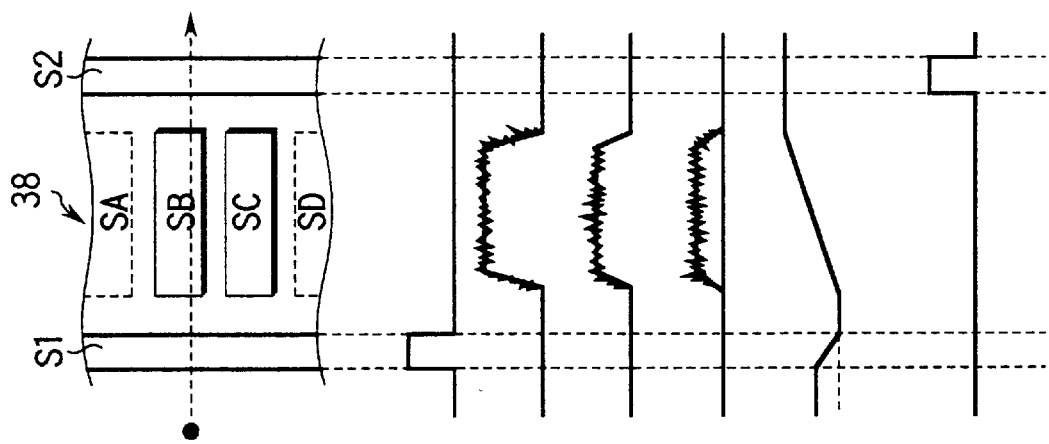
Figure 9C:
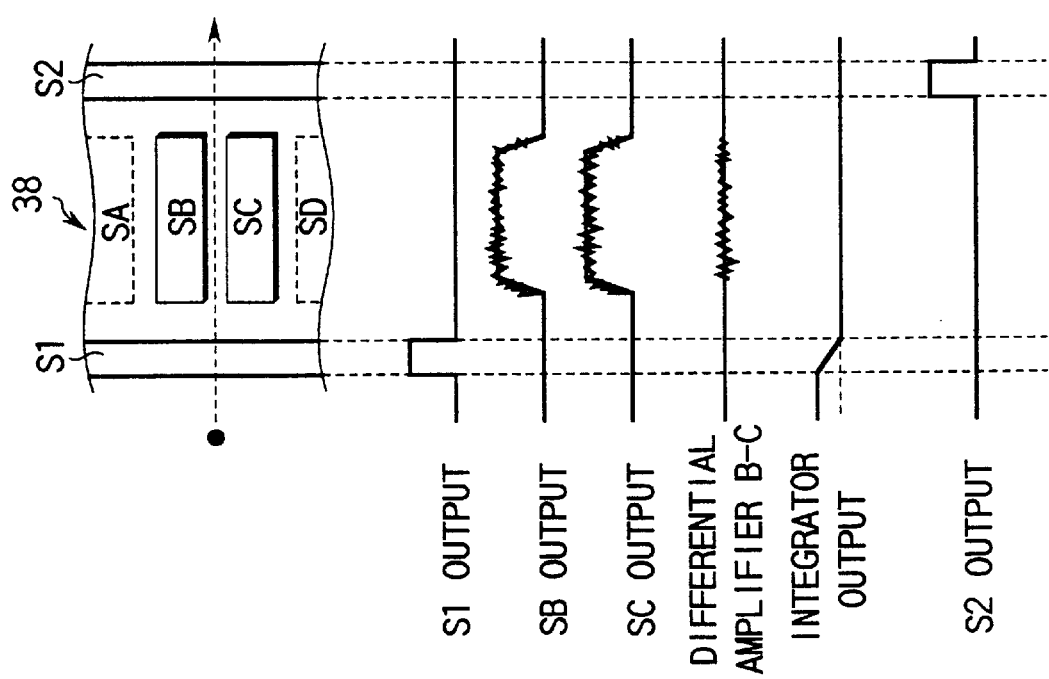

FIGS. 9A to 9C illustrate the relationship among the beam passing positions, the outputs from the beam position detector 38, the outputs from the differential amplifiers (B-C, C-D, D-E and E-F), and the output from the integrator 42 in the operation of the circuit shown in FIG. 8. A detailed description of the operation of the circuit shown in FIG. 7 may be omitted since this circuit differs from that shown in FIG. 8 in that the differential amplifiers are not provided and the output from one sensor pattern is amplified, integrated and A/D converted.

FIG. 9A illustrates a case where the light beam passes a just middle point between the sensor patterns SB and SC. FIG. 9B illustrates a case where the light beam passes a point closer to the sensor pattern SB, as compared to the case illustrated in FIG. 9A. FIG. 9C illustrates a case where the beam position detector 38 is mounted with an inclination to the beam passing direction. The output from the beam position detector 38, the output from the differential amplifier (B-C) and the output from the integrator 42 will now be described with respect to each case.

In the case of FIG. 9A, at first, the light beam crosses the sensor pattern S1, and a pulse signal is output from the sensor pattern S1. As is shown in FIG. 9A, the pulse signal resets the output of the integrator 42 to "0". Accordingly, when the beam crosses the sensor pattern S1, the previous detection result is reset, and a new detection result is integrated.

When the light beam passes through the middle point between the sensor patterns SB and SC, the outputs from the sensor patterns SB and SC are equal to each other, as shown in FIG. 9A. However, since the outputs from sensor patterns are very small, a small amount of noise component may be superimposed, as shown in FIG. 9A.

Such output signals are input to the differential amplifier B-C and a difference therebetween is amplified. When the outputs from the sensor patterns SB and SC are substantially equal, the output from the differential amplifier B-C is substantially zero, as shown in FIG. 9A, but a small amount of noise component may be superimposed. The differential amplification result thus obtained is input to the integrator 42 through the selection circuit (analog switch) 41.

The integrator 42 integrates the output from the differential amplifier B-C and outputs the integration result to the A/D converter 43. As is shown in FIG. 9A, noise components has been removed from the output from the integrator 42. The reason is that a high-frequency noise component superimposed on the differential amplification result is removed by the integration. As described above, at the same time as the light beam has passed over the sensor patterns SB and SC, the difference in outputs from the sensor patterns SB and SC is amplified and integrated, and then input to the A/D converter 43.

On the other hand, the output from the sensor pattern S2 is input to the A/D converter 43. Specifically, a pulse signal, as shown in FIG. 9A, is output from the sensor pattern S2 to the A/D converter 43, when the light beam has passed over the sensor patterns SB and SC. With the pulse signal received as a trigger, the A/D converter 43 starts to A/D convert the output of the integrator 42. Accordingly, the A/D converter 43 can timely convert the high S/N analog information on the beam passing position, from which the noise component has been removed, to a digital signal.

The operation of the circuit in FIG. 9B is basically the same as that of the circuit in FIG. 9A. However, since the beam passing position deviates towards the sensor pattern SB, the output from the sensor pattern SB is greater by the degree of deviation and the output from the sensor pattern SC is smaller. Thus, the output from the differential amplifier B-C deviates to the positive side accordingly. Like the case of FIG. 9A, the integrator 42 is reset when the beam passes over the sensor pattern S1. Then, the differential amplification result is input to the integrator 42. The integrator 42 gradually increases the output thereof, as long as the input (i.e. the output from the differential amplifier B-C) to the integrator 42 is on the positive side. When the input (i.e. the output from the differential amplifier B-C) has restored to zero, the integrator 42 keeps this value. Thus, the output from the integrator 42 represents the deviation of the beam passing position.

In the same manner as in the case of FIG. 9A, the A/D converter 43 A/D converts the integration result at the timing the light beam passes over the sensor pattern S2. Thus, the correct beam passing position is timely converted to digital information.

The operation of the circuit in FIG. 9C is basically the same as those in FIGS. 9A and 9B. However, since the light beam passes over the beam position detector 38 in a slanting direction, the outputs from the sensor patterns SB and SC, the output from the differential amplifier B-C and the output from the integrator 42 are characterized accordingly.

As is shown in FIG. 9C, the light beam, after passing over the sensor pattern S1, enters the region of the sensor patterns SB and SC at an angle from the pattern SC side. Then, the beam passes over substantially the middle point between the sensor patterns SB and SC and goes out of the region of the sensor patterns SB and SC at an angle toward the sensor pattern SB. In this case, the output from the sensor pattern SB is low immediately after the incidence of the beam and then gradually increases as the beam is passing, as shown in FIG. 9C. On the other hand, the output from the sensor pattern SC is high immediately after the incidence of the beam and then gradually decreases as the beam is passing.

The output from the differential amplifier B-C, to which such outputs from the sensor patterns SB and Sc have been input, is high on the negative side just after the incidence of the beam, and then gradually decreases. When the beam has passed over the middle point between the sensor patterns SB and SC, the output from the differential amplifier B-C becomes substantially zero. Then, the output gradually increases on the positive side and takes a maximum positive value just before the beam has passed the sensor patterns SB and SC.

The output from the integrator 42, to which the output of the differential amplifier B-C has been input, increases on the negative side just after the incidence of the beam. The value on the negative side continues to increase until the output from the differential amplifier B-C becomes zero. When the output from the differential amplifier B-C turns to the positive side, the negative value of the output of the integrator 42 decreases. Then the output of the integrator 42 becomes substantially zero when the beam has passed over the sensor patterns SB and SC.

Although the light beam crosses the beam position detector 38 in a slanting direction, it is considered that the beam passes through the middle point between the sensor patterns SB and SC on average. When the light beam has passed over the sensor pattern S2, the A/D converter 43 starts the A/D conversion operation. In this case, the integrated value is zero and also the digital data indicating the beam passing position is zero. In other words, it is considered that the beam has passed through the middle point between the sensor patterns SB and SC.

The relationship among the beam passing position, the outputs from sensor patterns S1, S2, SB and SC, the output from the differential amplifier B-C, the output from the integrator 42 and the operation of the A/D converter 43 has been described. The operations of the sensor patterns SC, SD, SE and SF and differential amplifier C-D, D-E and E-F are basically the same as those of the sensor patterns SB and SC and differential amplifier B-C and thus a description of the respective operations may be omitted.

The relationship between the beam passing position and the output from the A/D converter 43 will now be described with reference to FIGS. 10 and 11.

Figure 10:
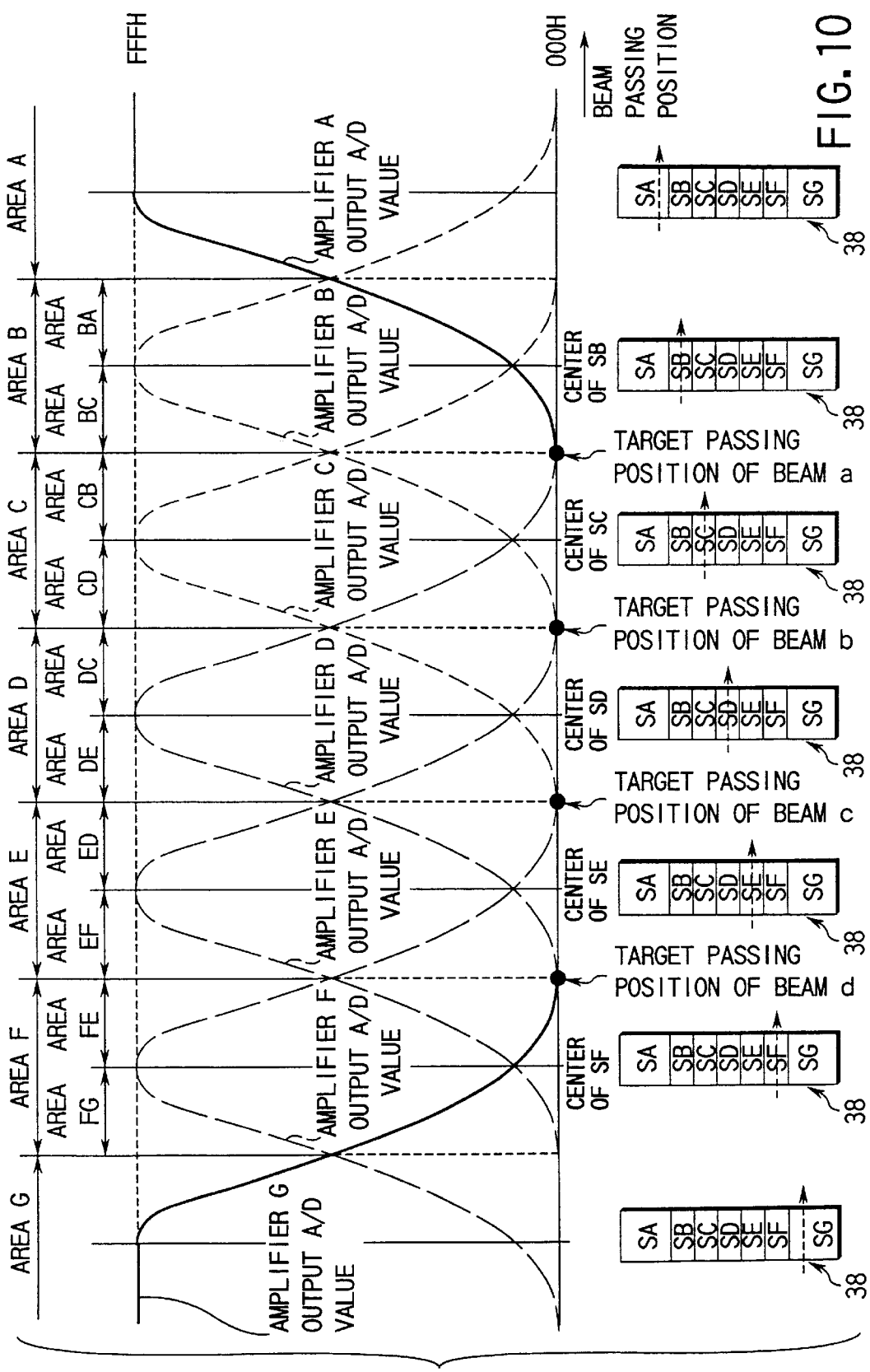
FIG. 10 is a graph showing a relationship between the light beam passing position and the output of the A/D converter.

The ordinate of the graph of FIG. 10 indicates the magnitude of the output of the A/D converter (12 bit) 43 as shown in FIG. 7, and the abscissa indicates the passing positions of the beams. As regards the beam passing positions on the abscissa, the beam passing position closer to the left-hand end indicates that the beam passes through a position closer to the sensor pattern SG, and the beam passing position closer to the right-hand end indicates that the beam passes through a position closer to the sensor pattern SA.

For example, when the light beam has passed just above the sensor pattern SC, the outputs from the amplifiers A, E, F and G are 000H (minimum), as seen from the graph of FIG. 10. The output of the amplifier C takes a maximum value (FFFH) since the light beam passes through the center of the sensor pattern SC. The outputs from both adjacent amplifiers B and D are about ⅕ of the maximum output.

For example, when the light beam passes over a point which deviates slightly from the center of the sensor pattern SC toward the sensor pattern SD, the output of the amplifier D increases and the outputs of the amplifiers B and C decrease. By monitoring the outputs of the amplifiers, the passing position of the light beam can be recognized. The lower part of FIG. 10 shows the relationship between the sensor patterns of the beam position sensor 38 for indicating the beam passing positions, on the one hand, and the beam passing positions.

If the target passing positions of the light beams a to d are indicated on the graph showing the output characteristic graph of the amplifiers (A to G) in relation to the beam passing positions, the target passing position of the beam a is located at the very middle point between the sensor patterns SB and SC, where the outputs from the amplifiers B and C are equalized. Similarly, the target passing positions of the beams b, c and d are located at the very middle points between the sensor patterns SC and SD, between the sensor patterns SD and SE and between the sensor patterns SE and SF. At these middle points, the outputs from the amplifiers C and D, from the amplifiers D and E and from the amplifiers E and F are equalized.

The relationship among the outputs from the A/D converter 43, which are obtained when the differential amplifiers (B-C, C-D, D-E and E-F) are used as shown in FIG. 8, will now be described with reference to FIG. 11. Like the case of FIG. 7, the amplifiers A and G are used for the sensor patterns SA and SG.

The output from the differential amplifier (B-C, C-D, D-E and E-F) may have either a positive value or a negative value. In this case, the output from the A/D converter 43 may vary as follows. When the output of the differential amplifier (B-C, C-D, D-E and E-F) has a positive value, the A/D converter 43 outputs values (A/D conversion values) from 000H (minimum value) to 7FFH (maximum value) as the output from the differential amplifier increases.

On the other hand, when the output of the differential amplifier (B-C, C-D, D-E and E-F) has a negative value, the A/D converter 43 outputs values (A/D conversion values) from 800H (minimum value) to FFFH (maximum value). In the case of the values on the negative side, the A/D conversion value with a large absolute value (close to the FFFH) indicates that the output of the integrator 42 is close to zero, i.e. the target value. On the other hand, the A/D conversion value with a small absolute value (close to 800H) indicates that the output of the integrator 42 has a large negative value.

A detailed description will now be given of the case where the output of the differential amplifier B-C associated with the sensor patterns SB and SC is A/D converted by the A/D converter 43.

The output of the sensor pattern SB is connected to a positive terminal of the differential amplifier B-C, and the output of the sensor pattern SC is connected to a negative terminal of the differential amplifier B-C. As is shown in FIG. 11, the output from the differential amplifier B-C takes a maximum value when the light beam passes near the center of the sensor pattern SB, and the A/D conversion value from the A/D converter 43 is 7FFH. The reason is that the output from the sensor pattern SB becomes maximum near the center.

When the light beam deviates from this position either toward the sensor pattern SA side or toward sensor pattern SC side, the A/D conversion value (output of differential amplifier B-C) decreases.

In addition, when the beam passing position has deviated toward the sensor pattern SA, neither the sensor pattern SB nor SC is able to detect the passage of the beam, and the A/D conversion value (output of differential amplifier B-C) becomes substantially zero.

By contrast, when the beam passing position has deviated toward the sensor pattern SC, the A/D conversion value (output from differential amplifier B-C) gradually decreases. The A/D conversion value becomes zero when the beam passes over the very middle point between the sensor patterns SB and SC. The reason is that the outputs from the sensor patterns SB and SC are equalized. In the present embodiment, this point is the target passing position of the light beam a.

When the beam passing point deviates toward the sensor pattern SC, the output of the differential amplifier B-C has a negative value, and the A/D conversion value varies from 000H to FFFH. Then, the A/D conversion value gradually decreases. Besides, if the beam passing position becomes close to the center of the sensor pattern SC, the output of the differential amplifier B-C takes a maximum negative value, and the A/D conversion value becomes 800H.

When the beam passing position deviates toward the sensor pattern SD, the output of the differential amplifier B-C has a smaller negative value and the A/D conversion value increases from 800H. At last, the A/D conversion value varies from FFFH to 000H. The reason is that the beam passing position deviates toward the sensor pattern SD (SE) side excessively and neither the sensor pattern SB nor SC is able to detect the passing of the beam, so that both outputs from the sensor patterns SB and SC becomes zero and no difference arises therebetween.

The control characteristics of the galvanomirror 33 will now be described.

Figure 12:
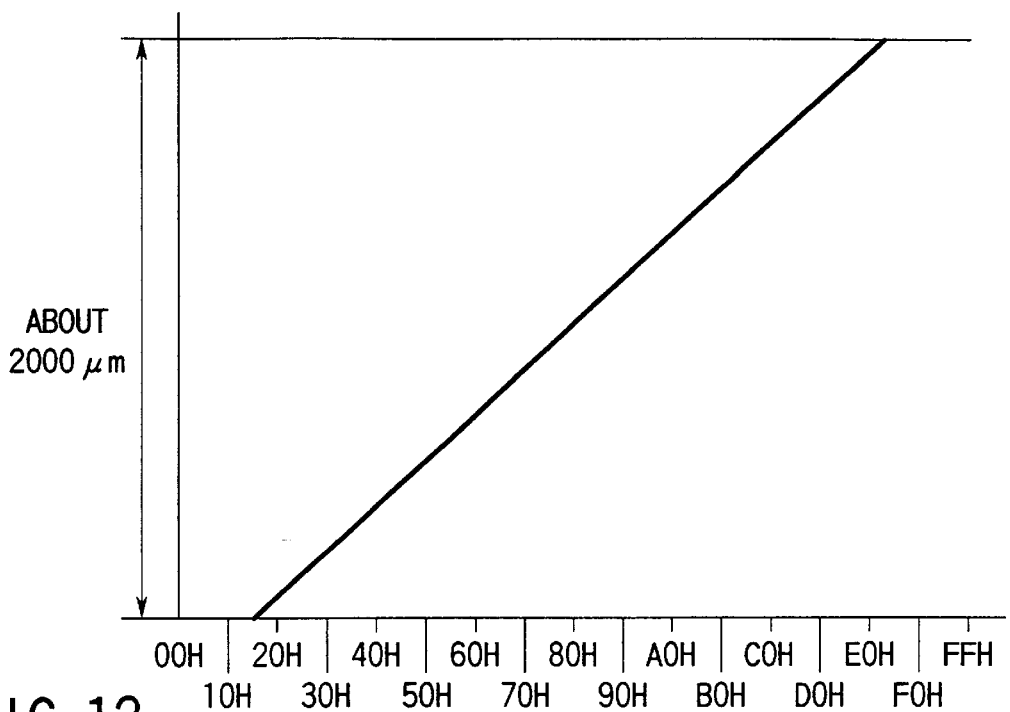
FIG. 12 is a graph illustrating the operational resolution of a galvanomirror.
Figure 13:
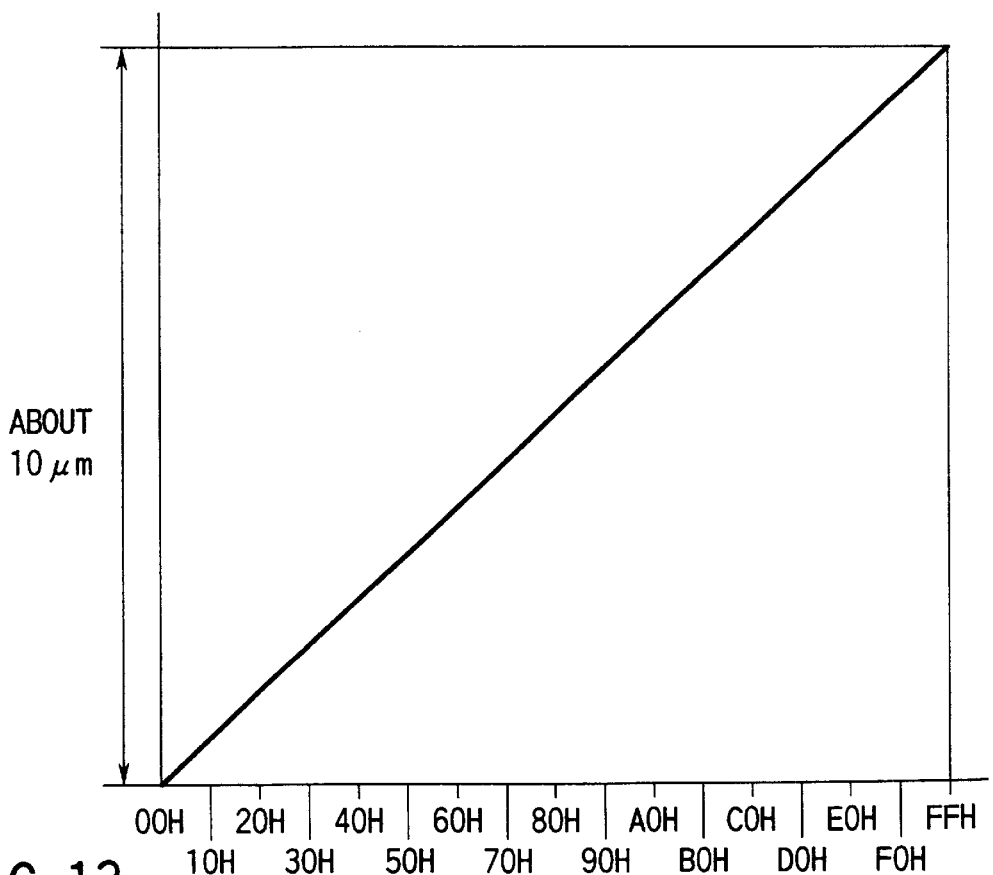
FIG. 13 is a graph illustrating the operational resolution of a galvanomirror.

FIGS. 12 and 13 show the relationship between the data delivered to the galvanomirror drive circuits 39a to 39d and the light beam passing positions on the beam position detector 38 (i.e. on the photosensitive drum 15). As is shown in FIGS. 7 and 8, the input signals to the D/A converters 45a to 45d of galvanomirror drive circuits 39a to 39d have 16-bit construction.

FIG. 12 shows the state of variation of the beam passing position, which is associated with the upper 8 bits of the input 16-bit signal. As is shown in FIG. 12, the beam passing position varies in the range of 2000 $\mu$m (2 mm) in relation to data 00H to FFH. The inputs near 00H and FFH are out of the range of responsivity of the galvanomirror 33, and the beam passing position is unchanged.

However, in the range of inputs between 18H and E8H, the beam passing position varies substantially linearly in relation to these inputs. As to the ratio of variation, 1LSB corresponds to about 10 $\mu$m.

FIG. 13 shows the state of variation of the beam passing position, which is associated with the lower 8 bits of the input 16-bit signal to the D/A converter 65 of galvanomirror drive circuit 39. It should be noted that FIG. 13 shows the state of variation of the beam passing position, which is associated with the lower 8 bits, in the case where the value of the range, within which the beam passing position linearly varies, is input as the upper 8 bits. As is clear from the figure, the beam passing position varies within the range of about 10 $\mu$m in relation to data between 00H to FFH in association with the lower 8 bits. 1LSB corresponds to 0.04 $\mu$m.

In this manner, the main control unit 51 delivers 16-bit data to the galvanomirror drive circuits 39. Thereby, the beam passing position on the beam position detector 38 or the photosensitive drum 15 can be moved with the resolution of about 0.04 $\mu$m within the range of about 2000 $\mu$m (2 mm).

The operation of the printer unit 2 at the time of power on will now be generally described with reference to the flow chart of the flow chart. A description of the scanner unit 1 is omitted.

When the copying machine is switched on, the main control unit 51 rotates the fixing rollers in the fixing device 26 and starts the heating control for the fixing device 26 (S1, S2). The beam passing position control routine in the sub-scan direction is executed, and the beam passing position is controlled at a predetermined position (S3).

If the beam passing position is correctly controlled, synchronization in the main scan direction is established. At the same time, APC (auto-power control) is carried out by a hardware structure so that each light beam can be emitted with a desired power (S4). Then, the photosensitive drum 15 is rotated, and process-related initialization is effected (S5). For example, the conditions of the surface of photosensitive drum 15 are regulated.

After the series of initialization steps have been completed, the fixing rollers are kept rotating until the temperature of the fixing device 26 rises up to a predetermined level, and the copying machine is set in the standby state (S6). When the temperature of the fixing device 26 has reached a predetermined level, the rotation of the fixing rollers is stopped (S7) and a copying instruction is awaited (S8).

In the copying instruction wait state (S8), the beam passing position control routine is executed. then, if, for example, 30 minutes have passed (S9), the beam passing position control routine is executed once again (S10). Thereafter, the copying machine waits for a copying instruction once again (S8).

When the main control unit 51 receives a copying (printing) instruction through the control panel 53, it carries out a copying operation. At the time of performing the copying operation, a so-called inter-sheet process (a process to be carried out between image formation of one original and image formation of the next original), i.e. the beam passing position control in this embodiment, is performed.

Specifically, if the copying instruction is received, the-passing position of the light beam is detected to perform the beam passing position control (S11). Then, it is determined whether the magnitude of deviation of the beam passing position is greater than a predetermined value L (S12). If the deviation is greater than the predetermined value L, the beam passing position control is performed (S13). After the beam position control, the copying operation is performed once (S14). If the deviation of the beam passing position is less than the predetermined value in step S12, the copying operation is performed without carrying out the position control. Then, it is determined whether the copying instruction is continued (S8). If the copying instruction is continued, the position control and copying routine in the steps S11 to S14 are executed successively. Thereby, the light beam is controlled during the operation of the copying machine, without waiting for a special instruction from the operator.

Figure 14:
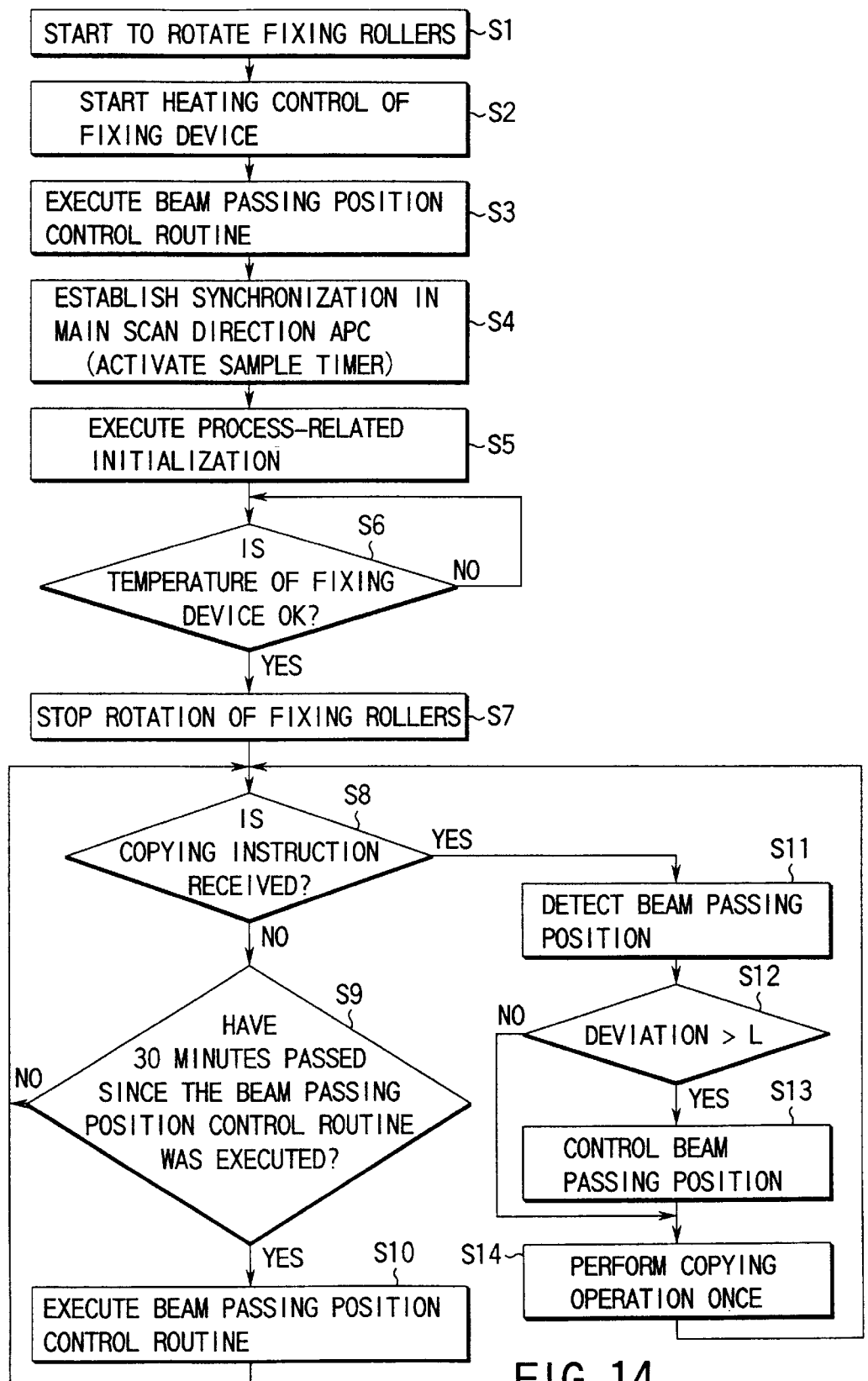

The beam passing position control routine in steps S3 and S10 in FIG. 14 will now be generally described with reference to FIG. 15.

At first, the main control unit 51 activates the polygon motor 36 and rotates the polygon mirror 35 at a predetermined rotational speed (S20).

The main control unit 51 reads out from the memory 52 control values (to be described later) of the galvanomirrors 33a to 33d set in the previous beam position control, and drives the galvanomirrors 33a to 33d on the basis of the control values (S21).

Then, the main control unit 51 turns on the light beam a alone and controls the passing position of the beam a (S22). In this position control, the passing position of the light beam a is detected, and it is determined whether the passing position is within a prescribed value range. If the detected passing position is not within the prescribed value range, the angle of the galvanomirror 33a is altered. If the detected passing position is within the prescribed value range, a flag indicating that the passing position of the beam a is within the prescribed value range is set.

Subsequently, the main control unit 51 detects the passing positions of the light beams b, c and d, like the beam a, and determines whether each of the passing positions of these beams is within the prescribed value range. If the passing positions are not within the prescribed value range, the associated galvanomirrors 33b to 33d are altered. If the detected passing positions are within the prescribed value range, flags indicating that the passing positions of the beams are within the prescribed value range are set (S23, S24, S25).

After the passing positions of the beams (a, b, c, d) are controlled, the main control unit 51 examines the flags and determines whether the beam passing position control should be finished (S26). Specifically, if all flags are set, the beam position control is finished. If any one of the flags is not set, the control returns to step S22 and the passing position control of each light beam is performed.

The operations of galvanomirrors (33a to 33d) in the above control flow will now be described in brief.

As has been described above, the angles of the galvanomirrors (33a to 33d) are altered on the basis of the control values supplied from the main control unit 51, thereby varying the passing positions of the scanning beams. However, the angles of the galvanomirrors are not necessarily controlled immediately in response to the instructions from the main control unit 51. Specifically, a time period on the order of "ns" or "$\mu$s" is needed from the time the control data is output from the main control unit 51, latched in the latches (44a to 44d) and D/A converted by the D/A converters (45a to 45d), and to the time drive signals proportional to the magnitude of the D/A converted data are output from the drivers (46a to 46d). On the other hand, the response time of the galvanomirrors (33a to 33d) used, e.g. in the present embodiment is on the order of 4–5 ms.

In this context, the response time refers to a time period from the time the angle of the galvanomirror (33a to 33d) begins to be varied by a new drive signal and moved (oscillated), to the time the movement (oscillation) is stopped and the galvanomirror rests at the new angle. Thus, in order for the main control unit 51 to confirm the control result after new control data is delivered to the galvanomirror (33a to 33d), the main control unit 51 needs to confirm the beam passing position after at least the response time.

In the present invention, the control result of the galvanomirror is confirmed after the oscillation of the galvanomirror is sufficiently reduced.

When the time needed for a single scan operation is 330 $\mu$s, 2.64 ms is required to acquire outputs from at least one amplifier or differential amplifier with respect to all surfaces (e.g. eight surfaces) of the polygon mirror 35 in steps S22, S23, S24 and S25. Accordingly, after, e.g. the galvanomirror a is controlled and the angle thereof begins to vary, the passing positions of the three beams b to d are detected (and/or each galvanomirror is controlled), and then the passing position of the light beam a is detected. In order to detect the passing positions of the beams b to d, at least 7.92 ms is required. Since the movement (oscillation) of the galvanomirror is already stopped within 7.92 ms, the mirror control result is confirmed in this state. Thus, the position detection of one light beam is performed in a cycle of at least 10.56 ms. Outputs of the amplifier or differential amplifier are acquired for all the surfaces of the polygon mirror 35, because inclination of the surfaces of the polygon mirror (i.e. influence of inclination of mirror surfaces from ideal angles) needs to be eliminated.

The operation of each control step differs between the system shown in FIG. 7 and that in FIG. 8. Thus, the operations of the individual systems will now be described in detail.

Figure 15:
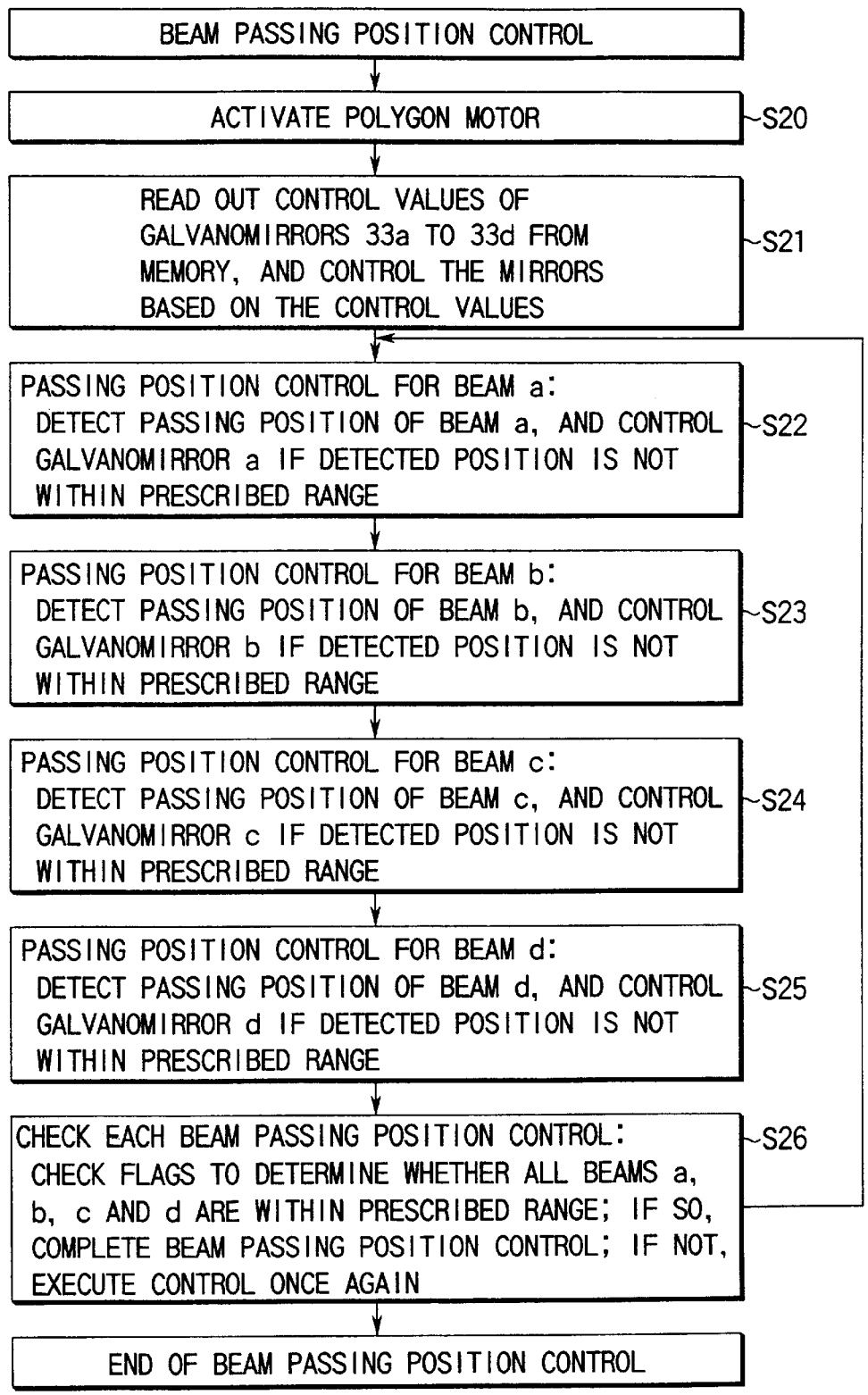
FIG. 15 is a flow chart illustrating a light beam passing position control routine.
Figure 16:
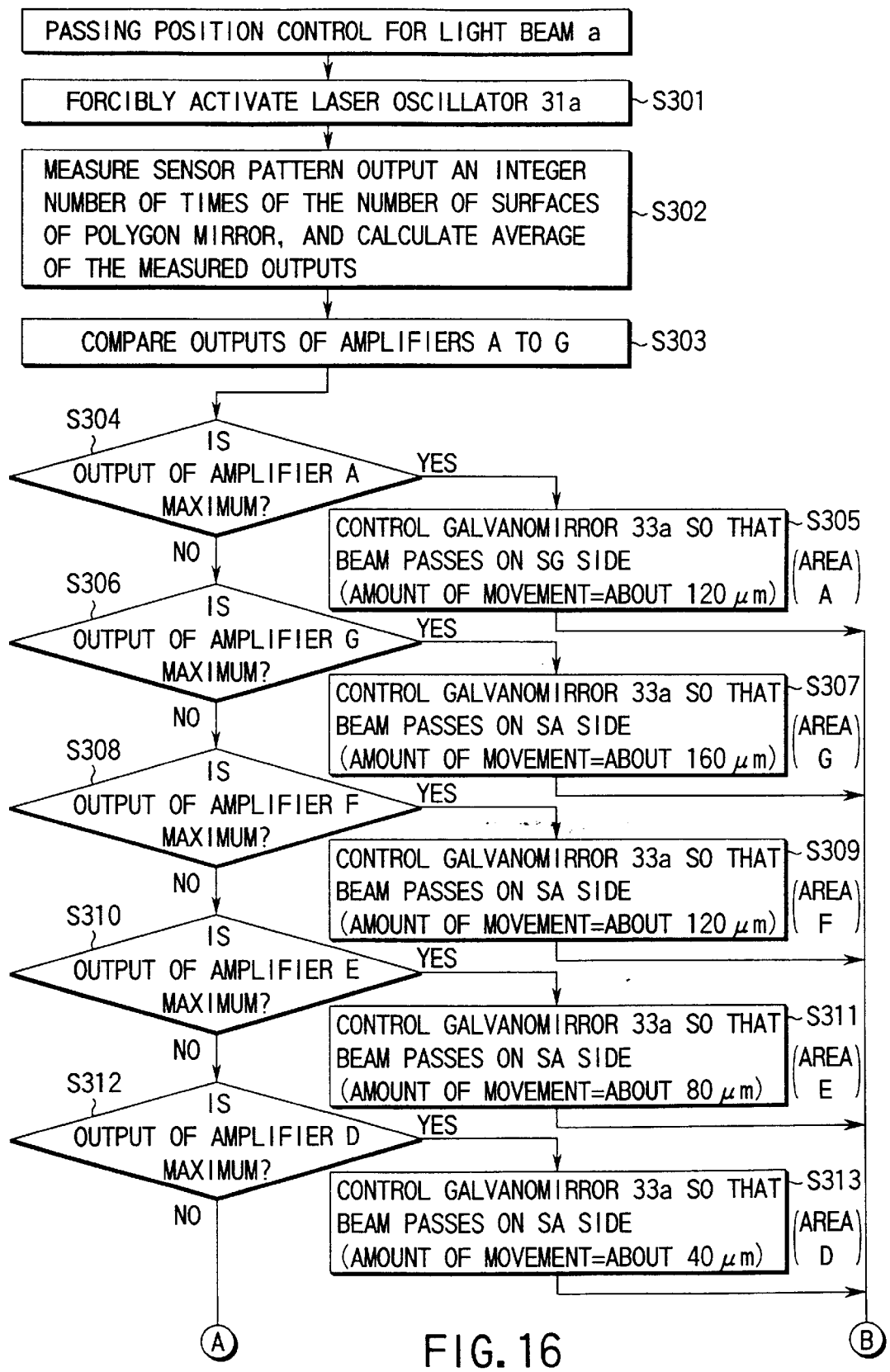
FIG. 16 is a flow chart illustrating a light beam passing position control routine.
Figure 17:
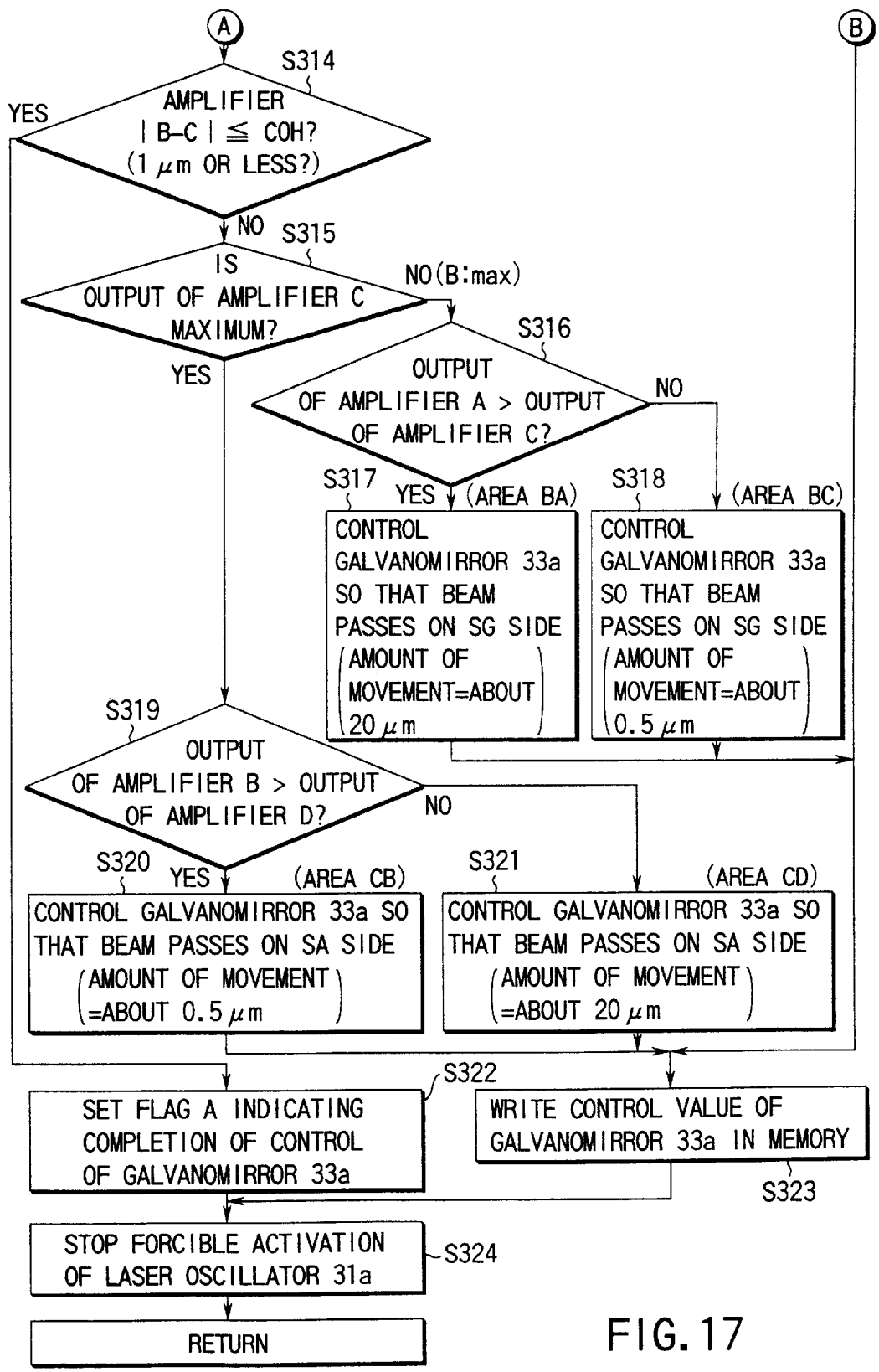
FIG. 17 is a flow chart illustrating a light beam passing position control routine.
Figure 18:
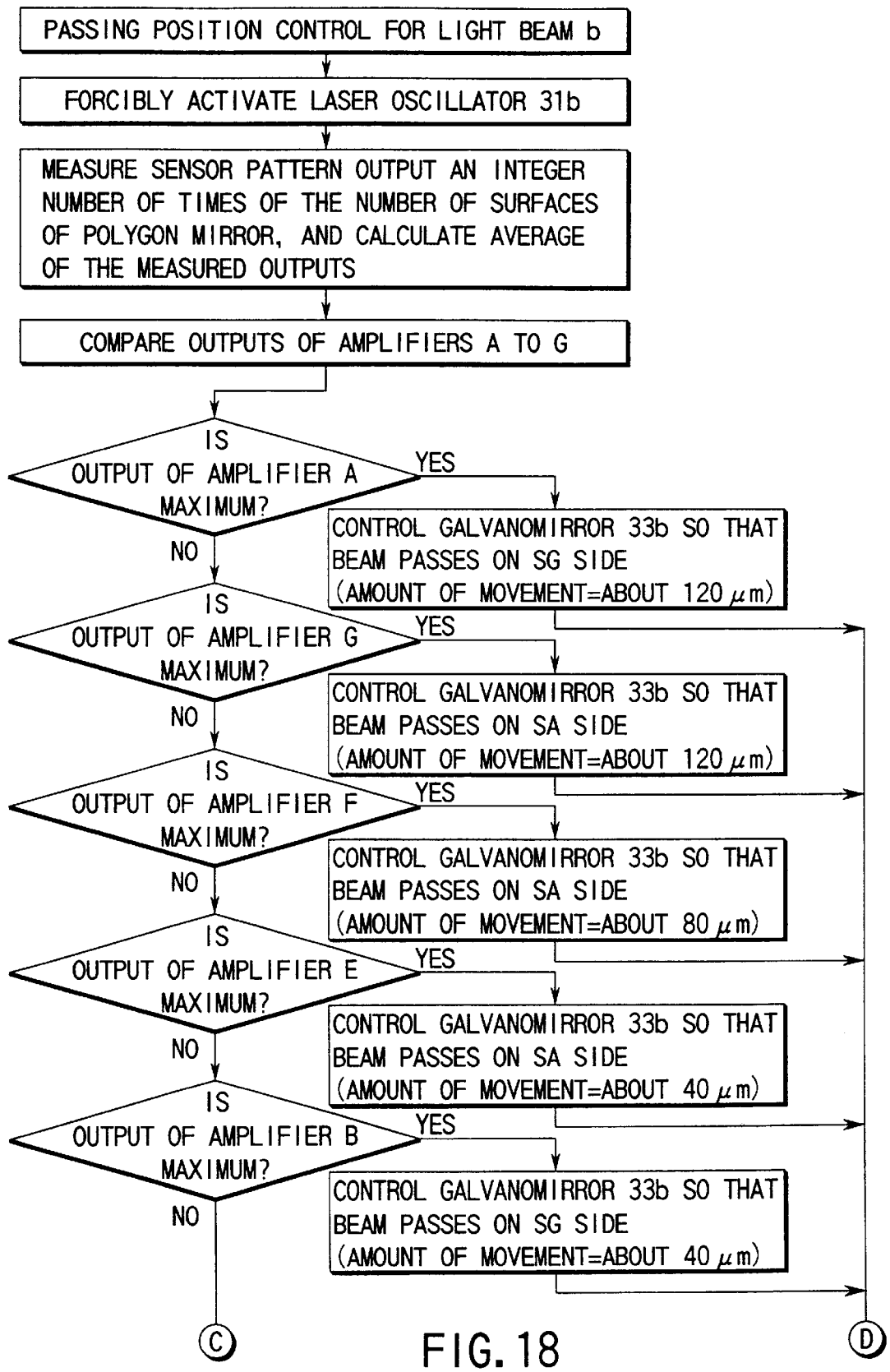
FIG. 18 is a flow chart illustrating a light beam passing position control routine.
Figure 19:
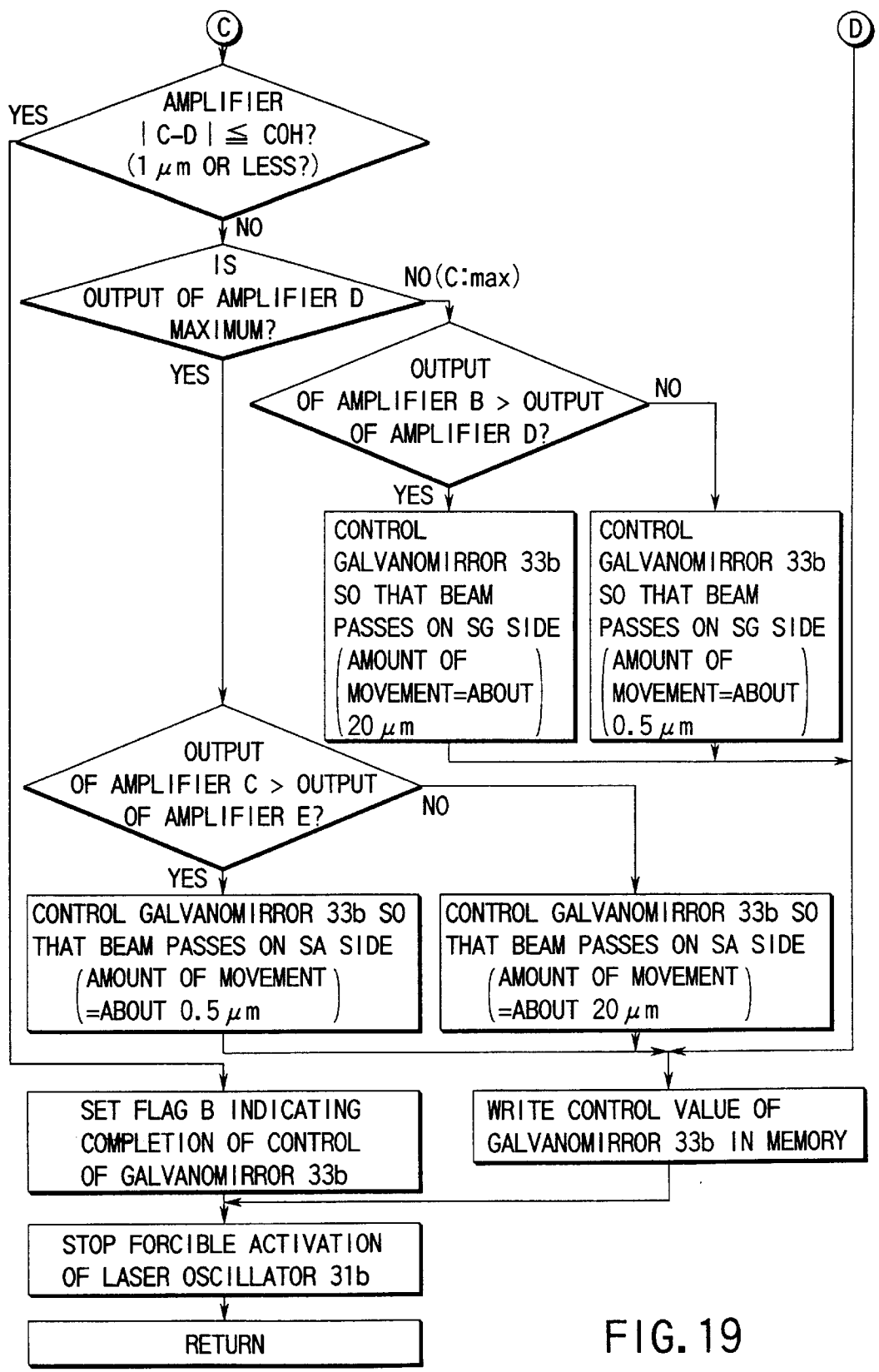
FIG. 19 is a flow chart illustrating a light beam passing position control routine.
Figure 20:
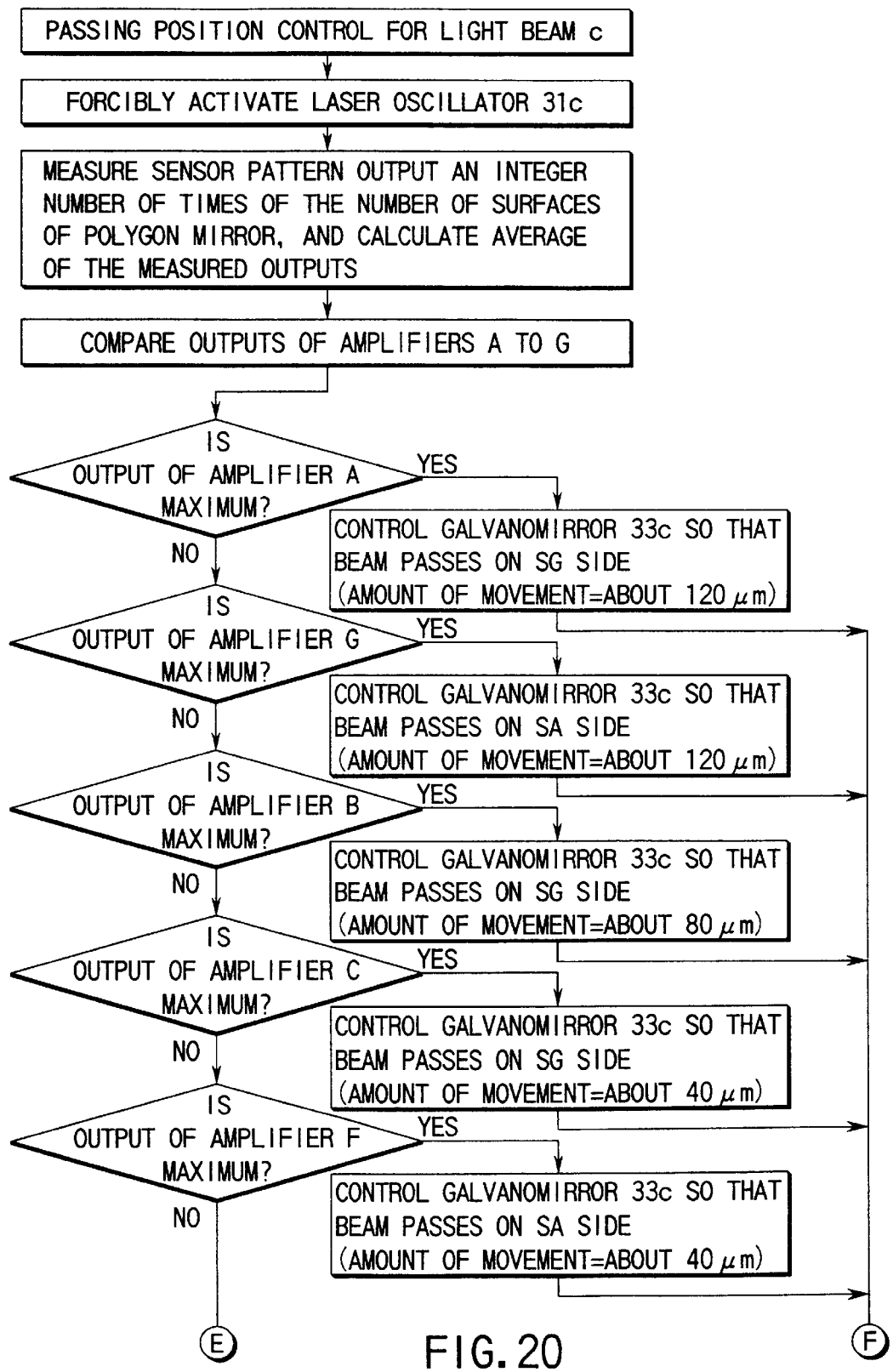
FIG. 20 is a flow chart illustrating a light beam passing position control routine.
Figure 21:
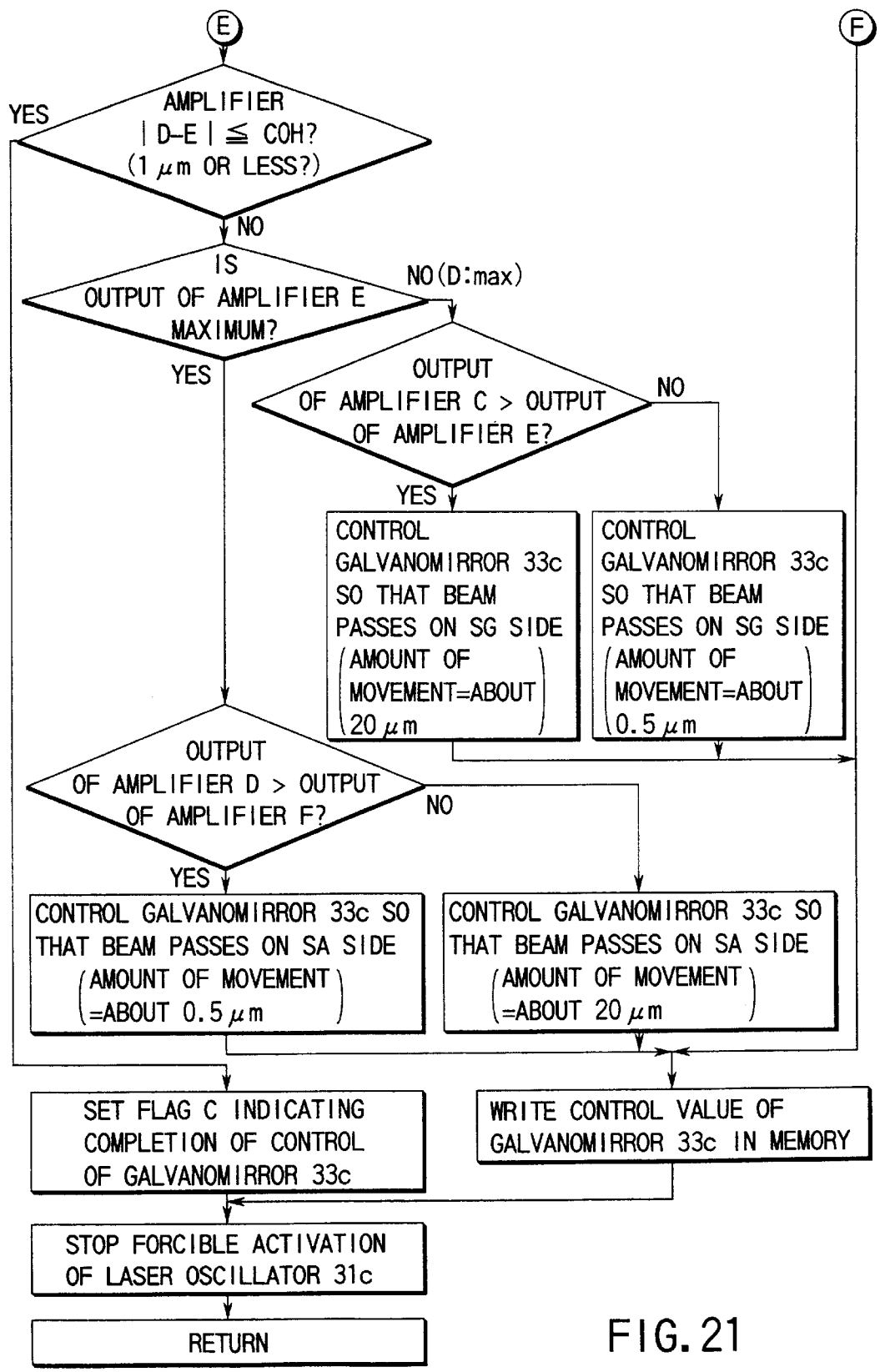
FIG. 21 is a flow chart illustrating a light beam passing position control routine.
Figure 22:
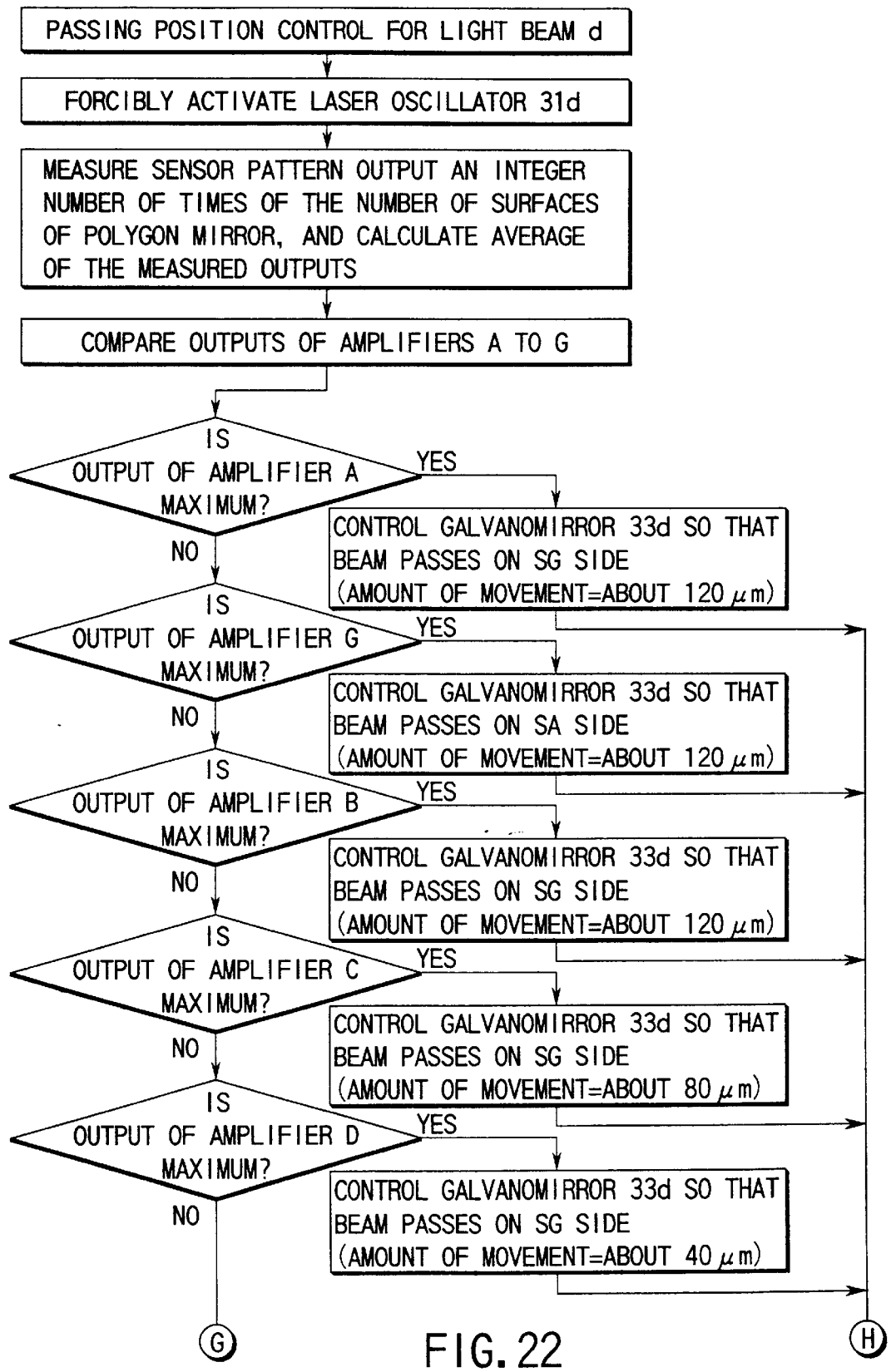
FIG. 22 is a flow chart illustrating a light beam passing position control routine.
Figure 23:
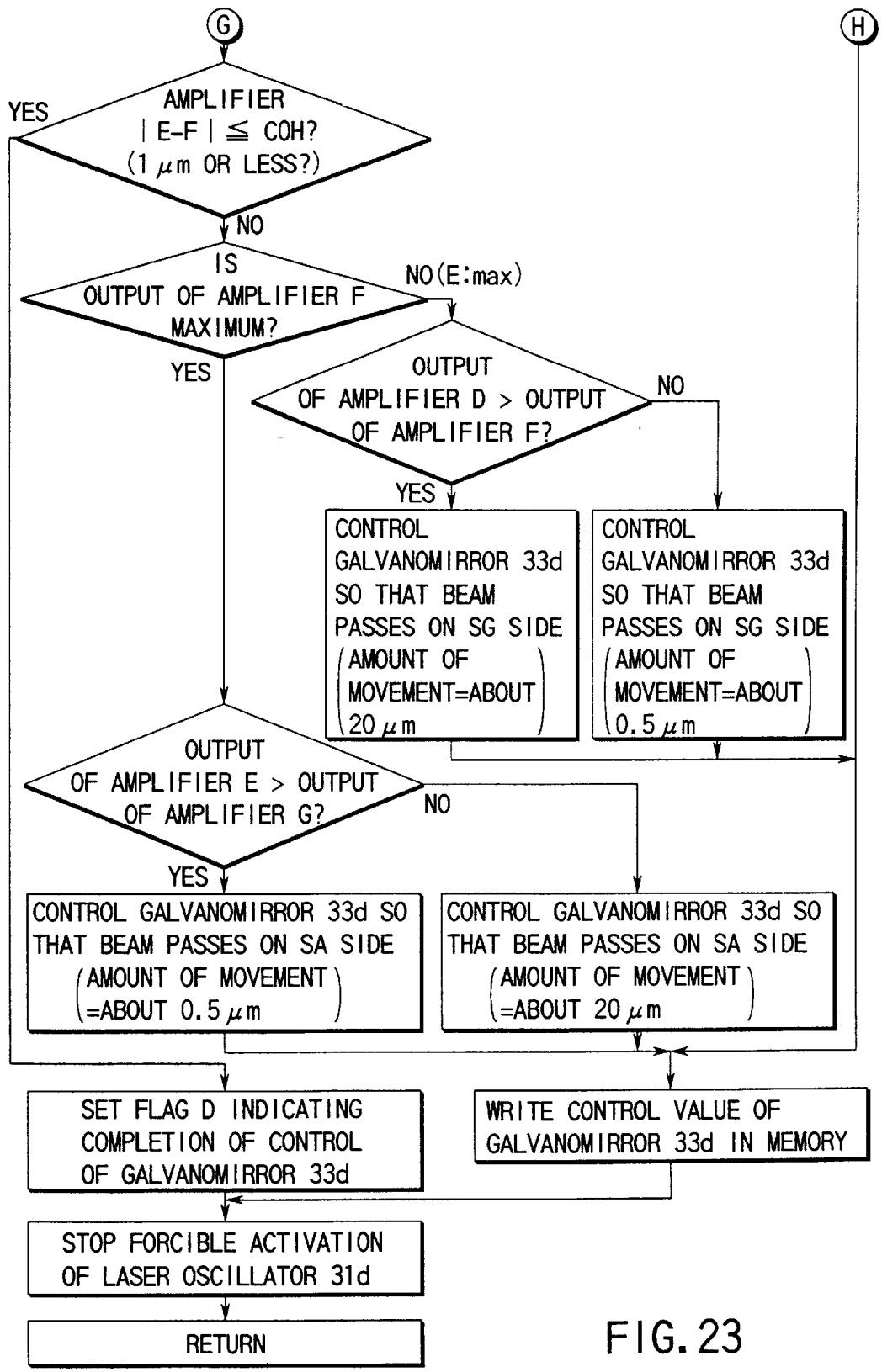
FIG. 23 is a flow chart illustrating a light beam passing position control routine.

FIGS. 16 and 17 are flow charts for describing in detail the operations in step S22 in FIG. 15 with respect to the system shown in FIG. 7. That is, FIGS. 16 and 17 are flow charts for describing the passing position control of the light beam a in the case of using the system shown in FIG. 7. As has been described above, FIG. 10 shows the relationship between the beam passing position and the A/D conversion output in the system of FIG. 7. Thus, FIG. 10 will also be referred to.

At first, the main control unit 51 forcibly activates the laser oscillator 31a to emit light (S301). Thereby, the light beam a is made to cyclically scan over the beam position detector 38 by the rotation of the polygon mirror 35.

The main control unit 51 then reads A/D converted values of the outputs from the amplifiers (A to G) in accordance with interrupt signals (INT) output from the A/D converter 43. In general, the scan positions of light beams slightly vary, depending on the respective surfaces of the polygon mirror 35, because of inclinations of the surfaces. In order to eliminate the influence of the inclinations of the surfaces of the polygon mirror 35, it is desirable to read A/D converted values a number of times corresponding to the number of surfaces of polygon mirror 35 or an integer number of times of the number of surfaces of polygon mirror 35. The main control unit 51 averages output values from the A/D converter 43 corresponding to the respective amplifiers, and recognizes the averaged result as the outputs of the amplifiers.

Accordingly, if the output values from the A/D converter 43 are read a number of times corresponding to the number (8) of surfaces of polygon mirror 35 with respect to the amplifiers A to G, it is necessary to make the light beams scan 56 times (S302).

The main control unit 51 compares the obtained outputs of the amplifiers A to G (S303). It is determined, based on the comparison result, whether the output from the amplifier A is maximum (S304). If the output from the amplifier A is maximum, it is found that the passing position of the beam a is on the sensor pattern A or closest to the sensor pattern A. In other words, it is found that the light beam a passes over the area A in FIG. 10. Since the target passing position of the beam a is at the middle between the sensor patterns SB and SC, the galvanomirror 33a is controlled so that the light beam a may pass on the sensor pattern SG side (S305).

The control amount (the amount of movement of the beam) in this case is set at about 120 $\mu$m. The reason is that the sensor patterns A and G are large patterns located on both sides of the area of control target points, as described with reference to FIGS. 3 and 4, and the beam passing position needs to be altered to a relatively great degree while the beam is passing over the sensor patterns A and G. in order to approach the beam passing position to the target point as quickly as possible. Even when the output of the amplifier A is maximum, if the light beam a is passing over a point near the area B, the beam passing position may be altered excessively. However, in consideration of the total efficiency, the amount of movement of such a degree is necessary.

If the output from the amplifier A is not maximum in step S304, it is then determined whether the output from the amplifier G is maximum (S306). The outputs from the sensor patterns A and G located at opposite ends are first examined, because this achieves efficient control.

If the output from the amplifier G is maximum, it is found that the passing position of the beam a is on the sensor pattern G or closest to the sensor pattern G. In other words, it is found that the light beam a passes over the area G in FIG. 10. In this case, the galvanomirror 33a is controlled so that the light beam a may pass on the sensor pattern SA side and may approach the middle point between the sensor patterns SB and SC, which is the target passing position of the beam a (S307). The control amount (amount of movement) in this case needs to be about 160 $\mu$m, which is greater than the case of step S305.

If the output from the amplifier G is not maximum in step S306, the main control unit 51 determines whether the output from the amplifier F is maximum (S308).

If the output from the amplifier F is maximum, it is found that the passing position of the beam a is on the sensor pattern F or closest to the sensor pattern F. In other words, it is found that the light beam a passes over the area F in FIG. 10. In this case, the galvanomirror 33a is controlled so that the light beam a may pass on the sensor pattern SA side and may approach the middle point between the sensor patterns SB and SC, which is the target passing position of the beam a (S309). The control amount (amount of movement) in this case needs to be about 120 μm in consideration of the distance between the target point and the area F.

If the output from the amplifier F is not maximum in step S308, the main control unit 51 determines whether the output from the amplifier E is maximum (S310).

If the output from the amplifier E is maximum, it is found that the passing position of the beam a is on the sensor pattern E or closest to the sensor pattern E. In other words, it is found that the light beam a passes over the area E in FIG. 10. In this case, the valvanomirror 33a is controlled so that the light beam a may pass on the sensor pattern SA side and may approach the middle point between the sensor patterns SB and SC, which is the target passing position of the beam a (S311). The control amount (amount of movement) in this case needs to be about 80 μm in consideration of the distance between the target point and the area E.

If the output from the amplifier E is not maximum in step S310, the main control unit 51 determines whether the output from the amplifier D is maximum (S312).

If the output from the amplifier D is maximum, it is found that the passing position of the beam a is on the sensor pattern D or closest to the sensor pattern D. In other words, it is found that the light beam a passes over the area D in FIG. 10. In this case, the valvanomirror 33a is controlled so that the light beam a may pass on the sensor pattern SA side and may approach the middle point between the sensor patterns SB and SC, which is the target passing position of the beam a (S313). The control amount (amount of movement) in this case needs to be about 40 μm in consideration of the distance between the target point and the area D.

If the output from the amplifier D is not maximum in step S312, the output from the amplifier B or the output from the amplifier C is maximum. Now consider the final target control point. The ideal passing point of the light beam a is the very middle point between the sensor patterns SB and SC, at which the outputs from the amplifiers B and C are equalized, as mentioned above. However, it is very difficult to make the passing point of the beam a coincide exactly with the ideal passing point, and in this case a long time is needed for control. Thus, in the present embodiment, only the precision of ±1 μm from the ideal point is required. The reason is that if the beam passing position is controlled within this range, no problem arises on actual images.

The main control unit 51 finds the difference between the outputs of the amplifiers B and C (i.e. the difference between A/D conversion values) and determines whether the difference is C0H or less. The value of C0H corresponds to the distance of 1 μm on images (S314).

If the difference between the outputs of the amplifiers B and C (i.e. the difference between A/D conversion values) is C0H or less, it is found that the passing position of the beam a is within the predetermined range. Thus, a control completion flag A indicating the completion of control of galvanomirror 33a is set (S322).

On the other hand, if the difference between the outputs of the amplifiers B and C (i.e. the difference between A/D conversion values) is not C0H or less, it is found that the passing position of the beam a is not within the predetermined range. It is thus necessary to further determine the passing position of the light beam a. For this purpose, the main control unit 51 determines whether the output from the amplifier C is maximum (S315).

If the output from the amplifier C is not maximum, it is found that the output from the amplifier B is maximum, that is, the light beam a passes over the area B. In this case, the main control unit 51 compares the outputs from the amplifiers A and C and determines whether the passing position of the light beam a is located on the area BA or area BC (S316).

If the output from the amplifier A is greater, it is found that the beam a passes over the area BA. In such a case, the valvanomirror 33a is controlled so that the light beam a may pass on the sensor pattern SG side and may approach the middle point between the sensor patterns SB and SC, which is the target passing position of the beam a (S317). The control amount (amount of movement) in this case needs to be about 20 μm in consideration of the distance between the target point and the area BA.

If the output from the amplifier C is greater than that from the amplifier A, it is found that the beam a passes over the area BC and that the current passing point of the beam a is close to the target point. In such a case, the valvanomirror 33a is controlled so that the light beam a may pass on the sensor pattern SG side and may further approach the target point (S318). The control amount (amount of movement) in this case needs to be about 0.5 μm in consideration of the fact that the beam a is already close to the target point.

If the output from the amplifier C is maximum in step S315, it is found that the output from the amplifier C is maximum, that is, the light beam a passes over the area C. In this case, the main control unit 51 compares the outputs from the amplifiers B and D and determines whether the passing position of the light beam a is located on the area CB or area CD (S319).

If the output from the amplifier D is greater than that from the amplifier B, it is found that the beam a passes over the area CD. In such a case, the galvanomirror 33a is controlled so that the light beam a may pass on the sensor pattern SA side and may approach the middle point between the sensor patterns SB and SC, which is the target passing position of the beam a (S321). The control amount (amount of movement) in this case needs to be about 20 μm in consideration of the distance between the target point and the area CD.

If the output from the amplifier B is greater than that from the amplifier D, it is found that the beam a passes over the area CB and that the current passing point of the beam a is close to the target point. In such a case, the galvanomirror 33a is controlled so that the light beam a may pass on the sensor pattern SA side and may further approach the target point (S320). The control amount (amount of movement) in this case needs to be about 0.5 μm in consideration of the fact that the beam a is already close to the target point.

When the light beam a does not pass within the range of ±1 μm from the ideal passing point (steps S305, S307, S309, S311, S313, S317, S318, S320, S321), the main control unit 51 controls the galvanomirror 33a by a predetermined amount and writes the control amount in the memory 52 (S323). The control value (the added value of control values) written in the memory 52 is referred to at the time of the beam passing position control, as in step S3, which is initially performed when power is turned on. Thus, each galvanomirror is controlled.

As has been described above, the main control unit 51 sets the control completion flag A indicating the completion of control of the galvanomirror 33a when the beam a passes within the range of ±1 μm from the ideal passing point. When the beam a does not pass within the range of ±1 μm from the ideal passing point, the main control unit 51 sets the galvanomirror control amount in accordance with the beam passing position (area) and writes the control amount in the memory 52.

Then, the main control unit 51 stops the forcible activation of the laser oscillator 31a and completes the series of the control operations for the passing position of the beam a (S324).

As has already been described with reference to FIG. 15, when the control completion flag A for the galvanomirror 33a is not set, the passing position control routine for the beam a is executed once again. In other words, this routine is repeated until the beam a passes within the range of ±1 μm from the ideal passing point.

FIGS. 18 to 23 are flow charts illustrating the control operations for the light beams b to d. Although a detailed description of the respective control operations is omitted, these control operations are basically the same as the control operation for the light beam a. The laser oscillators 31b to 31d are forcibly activated, and the outputs from the amplifiers A to G are compared. If the beam passing positions are within the range of ±1 μm from the ideal control point, the control completion flags B to D indicating the completion of the control of galvanomirrors 33b to 33d are set up. If the beam passing positions are not within this range, it is determined over which areas the light beams (b to d) are passing and the galvanomirrors 33b to 33d are controlled according to the determined areas. The control values in this case are written in the memory 52.

Figure 24:
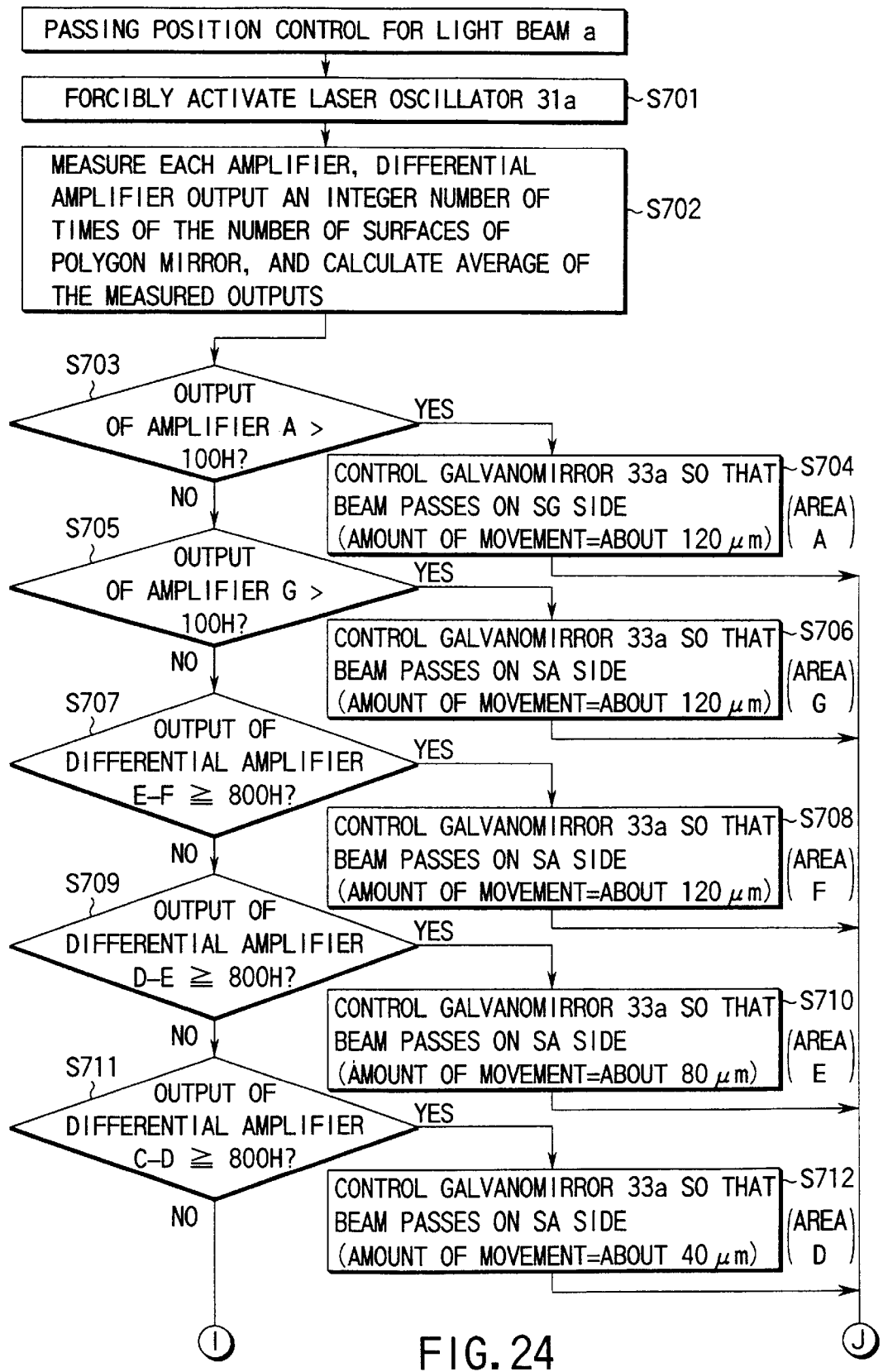
FIG. 24 is a flow chart illustrating a light beam passing position control routine.
Figure 25:
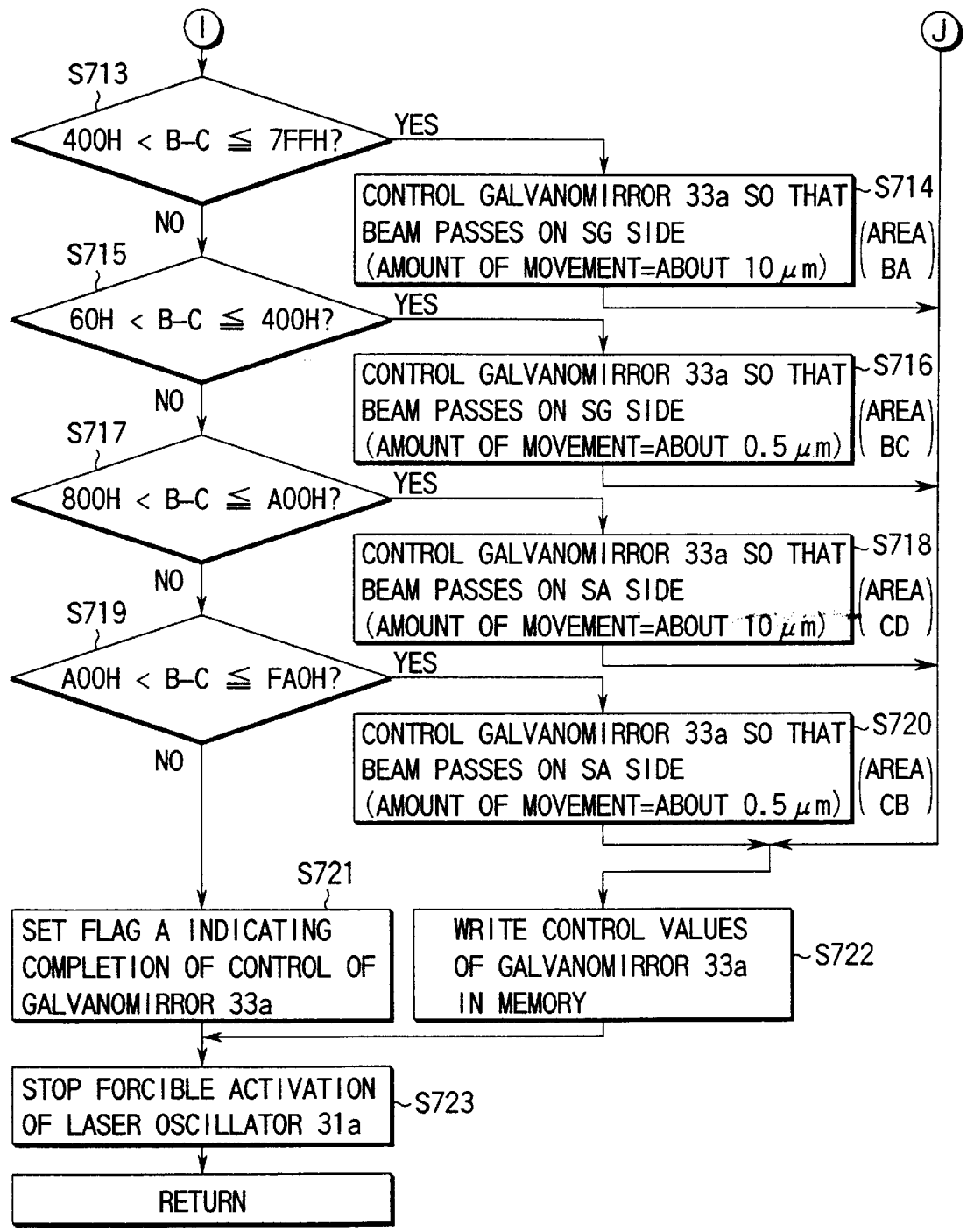
FIG. 25 is a flow chart illustrating a light beam passing position control routine.
Figure 26:
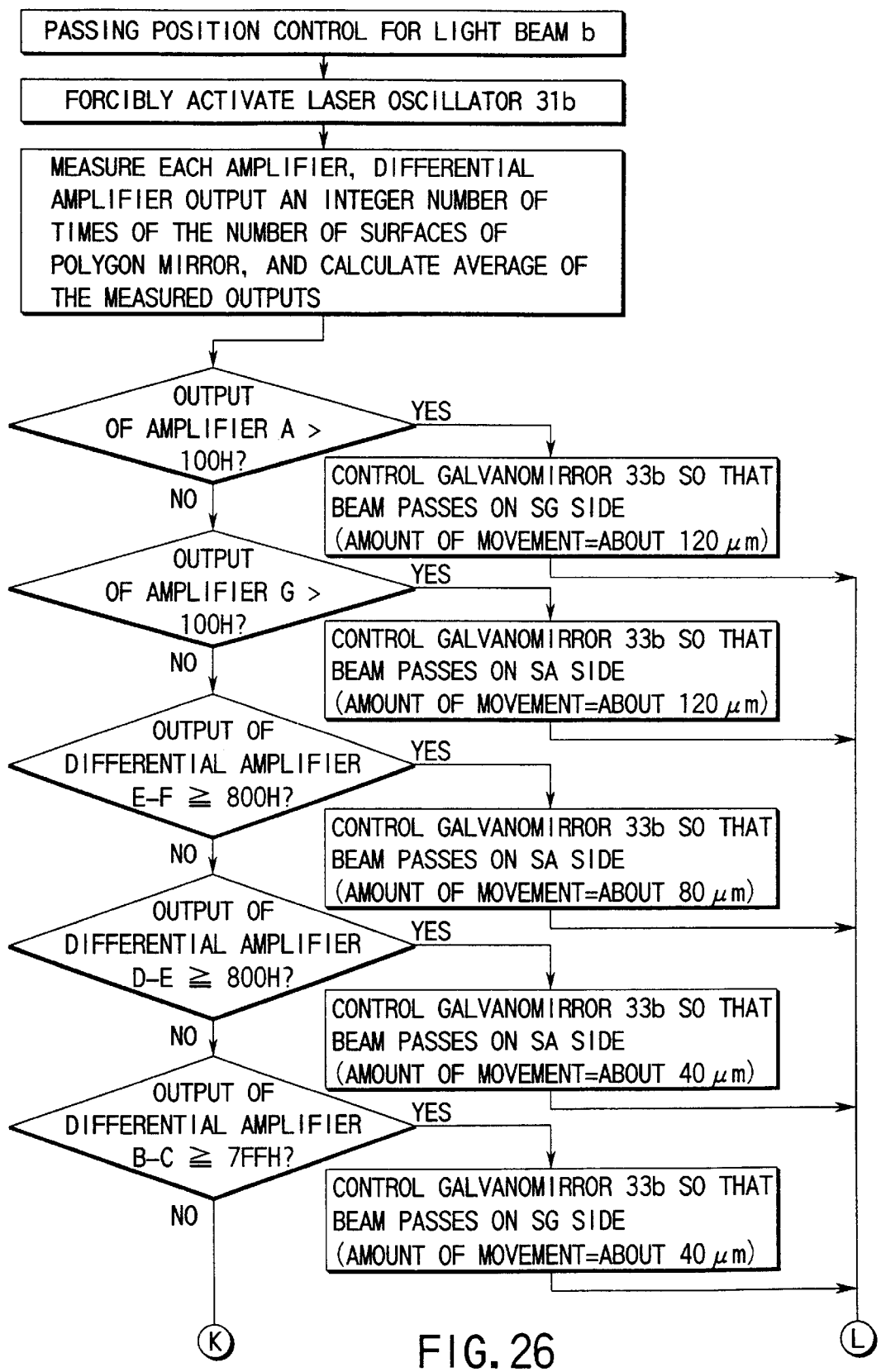
FIG. 26 is a flow chart illustrating a light beam passing position control routine.
Figure 27:
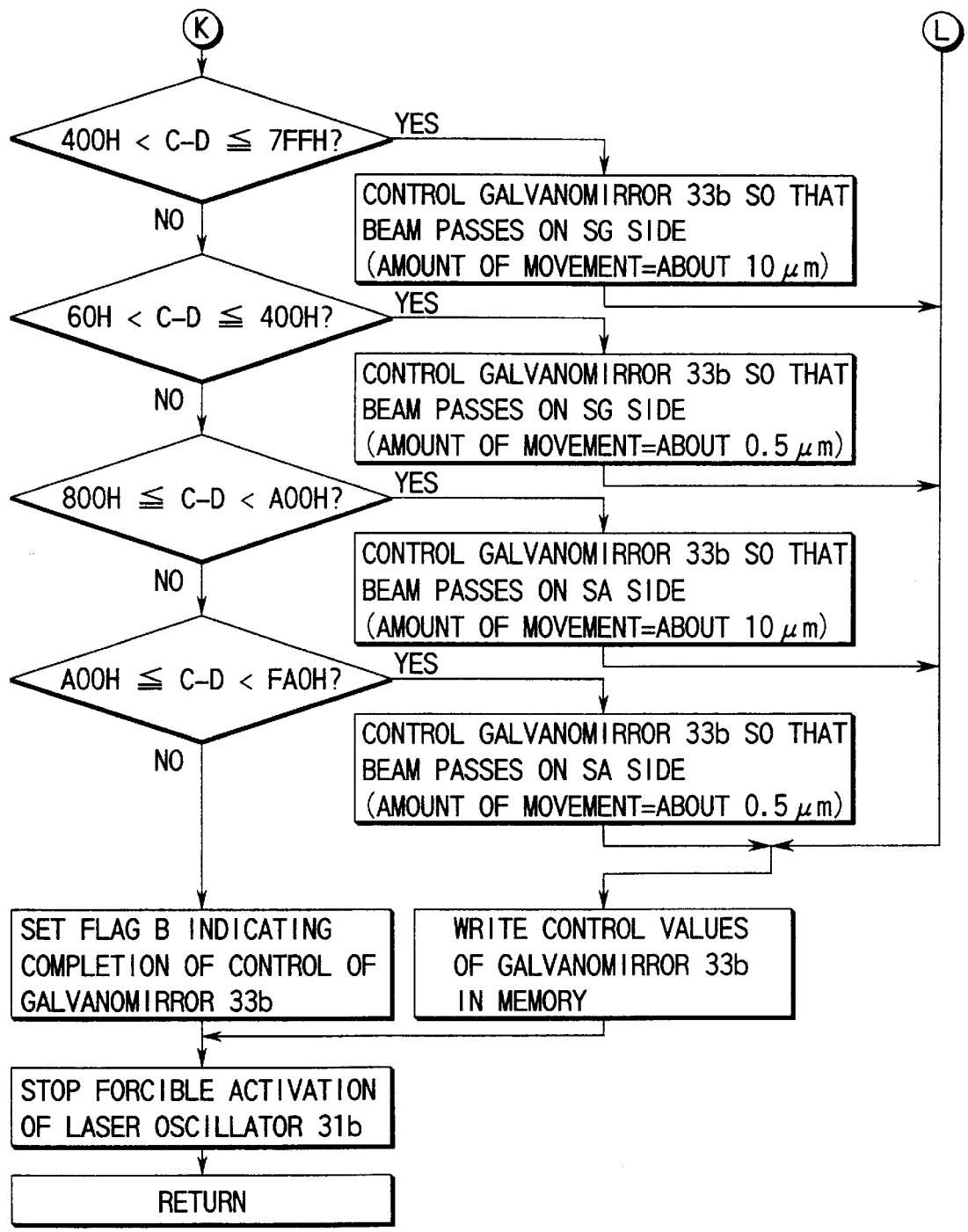
FIG. 27 is a flow chart illustrating a light beam passing position control routine.
Figure 28:
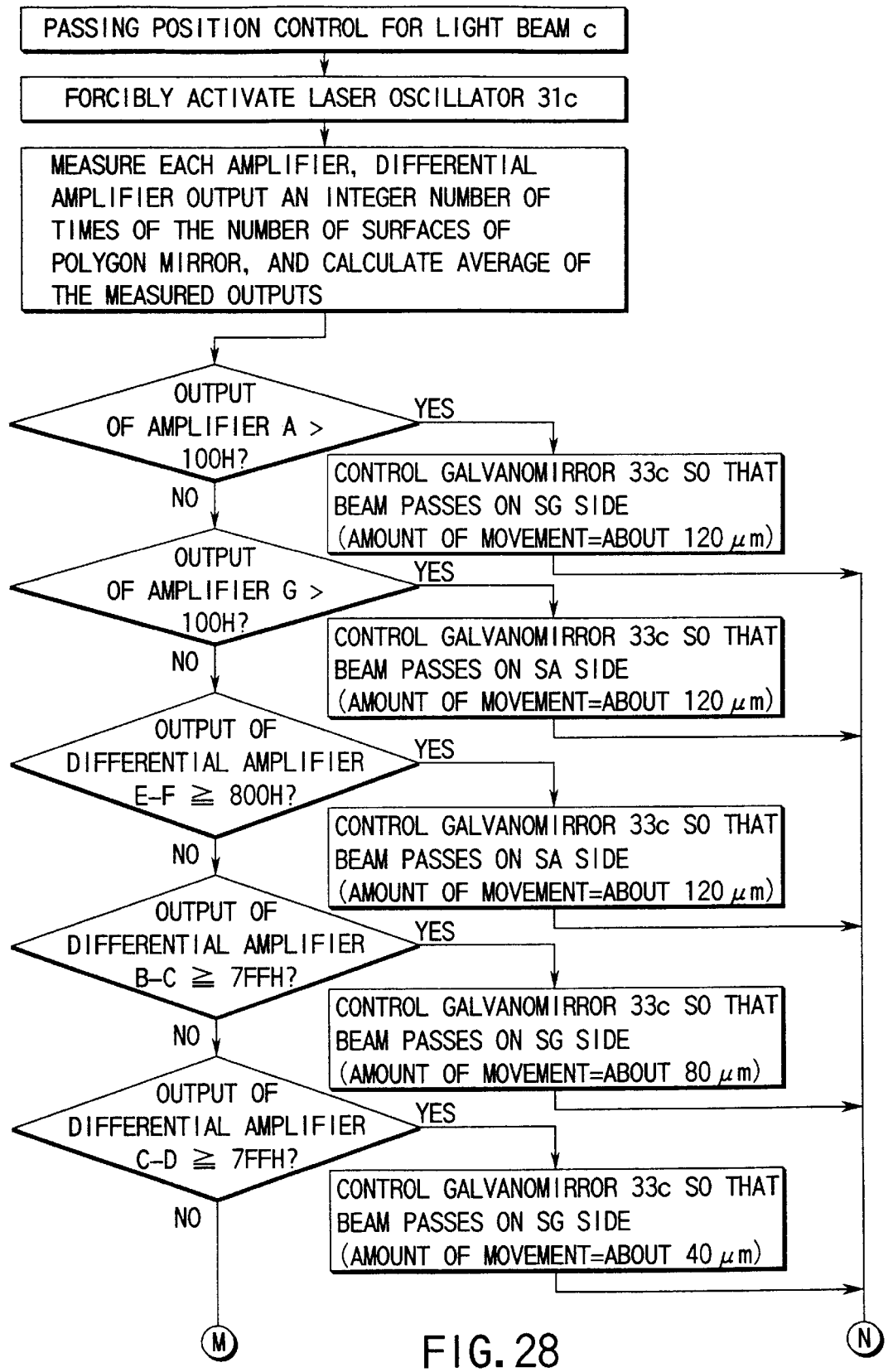
FIG. 28 is a flow chart illustrating a light beam passing position control routine.
Figure 29:
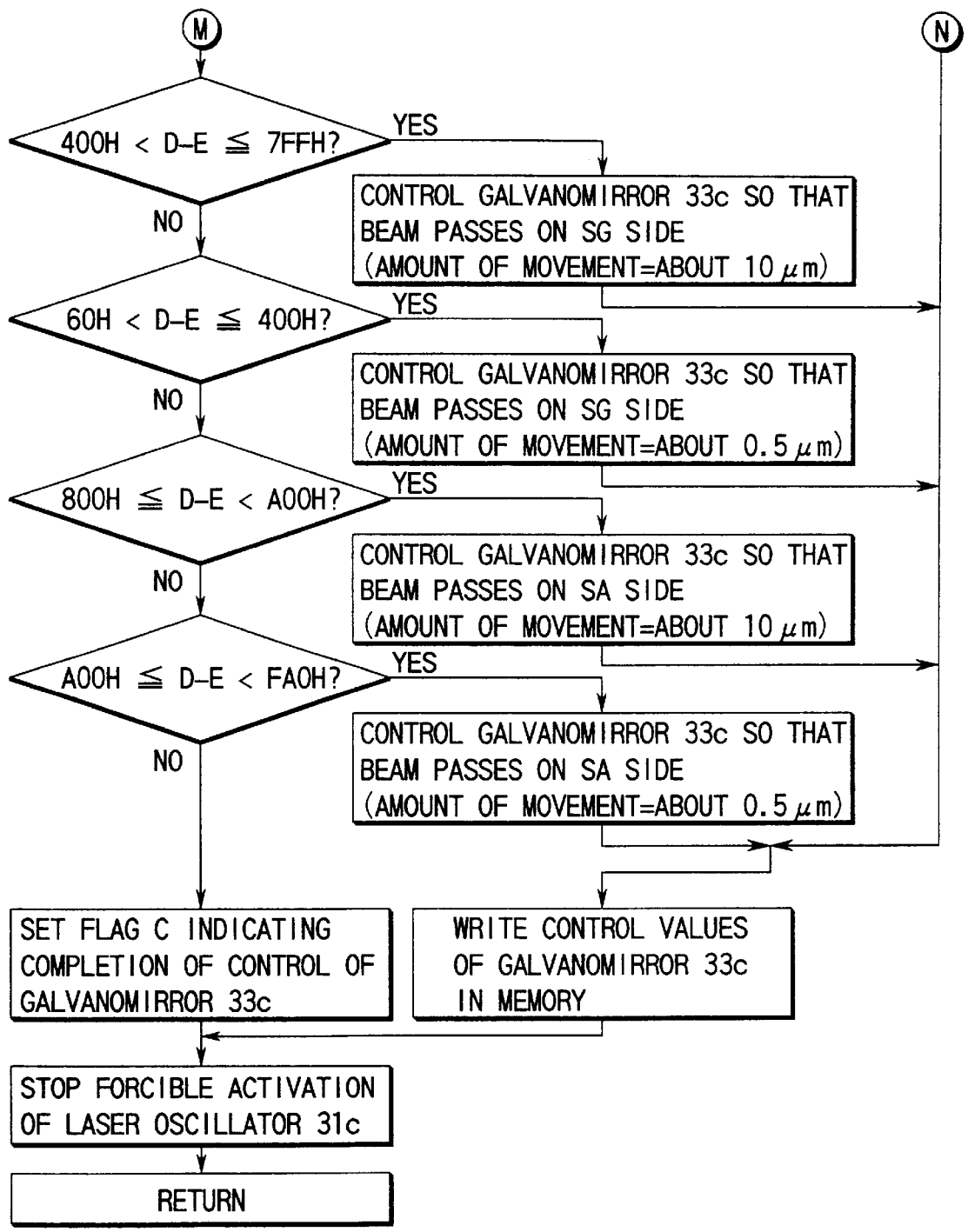
FIG. 29 is a flow chart illustrating a light beam passing position control routine.
Figure 30:
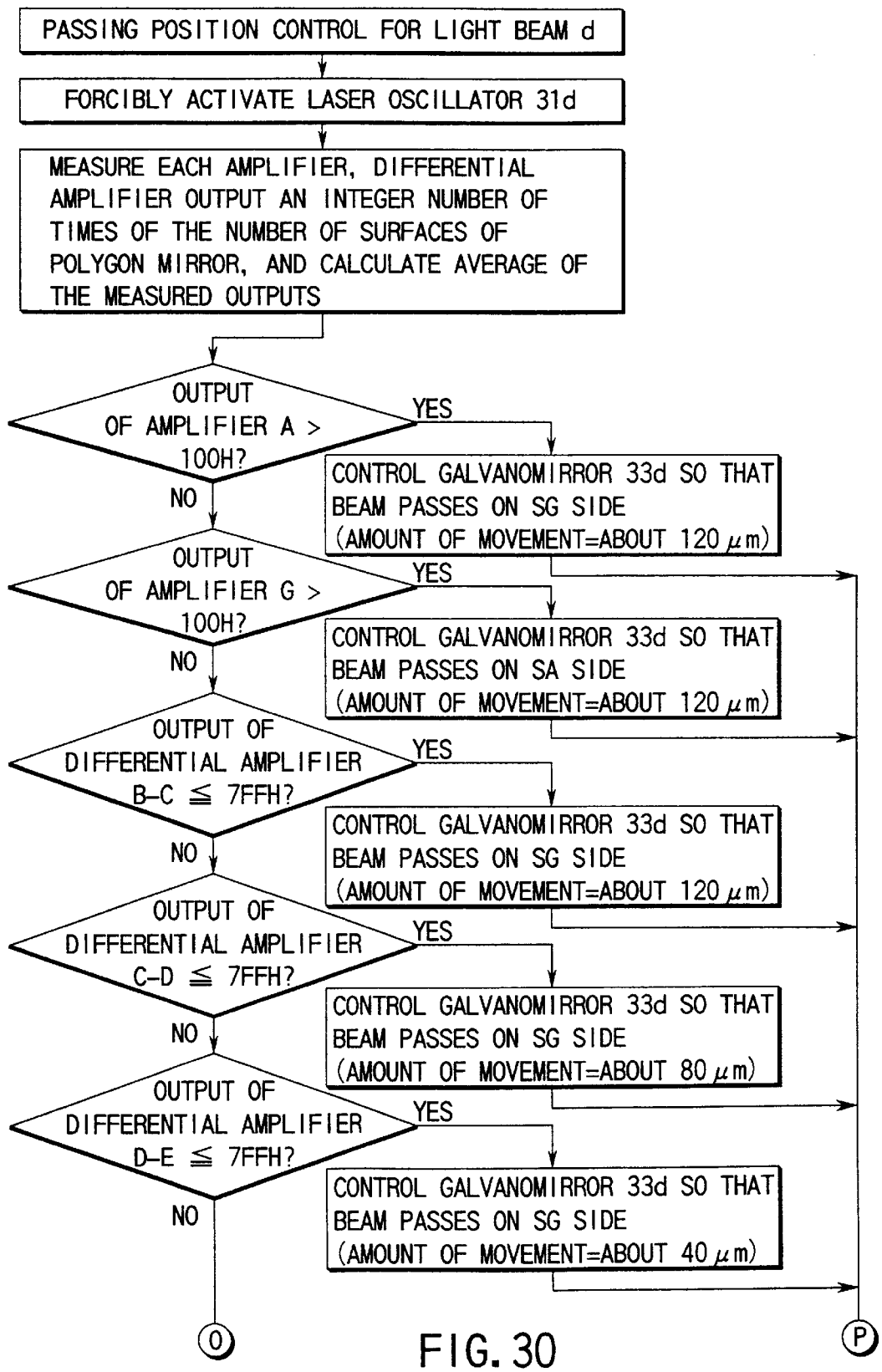
FIG. 30 is a flow chart illustrating a light beam passing position control routine.
Figure 31:
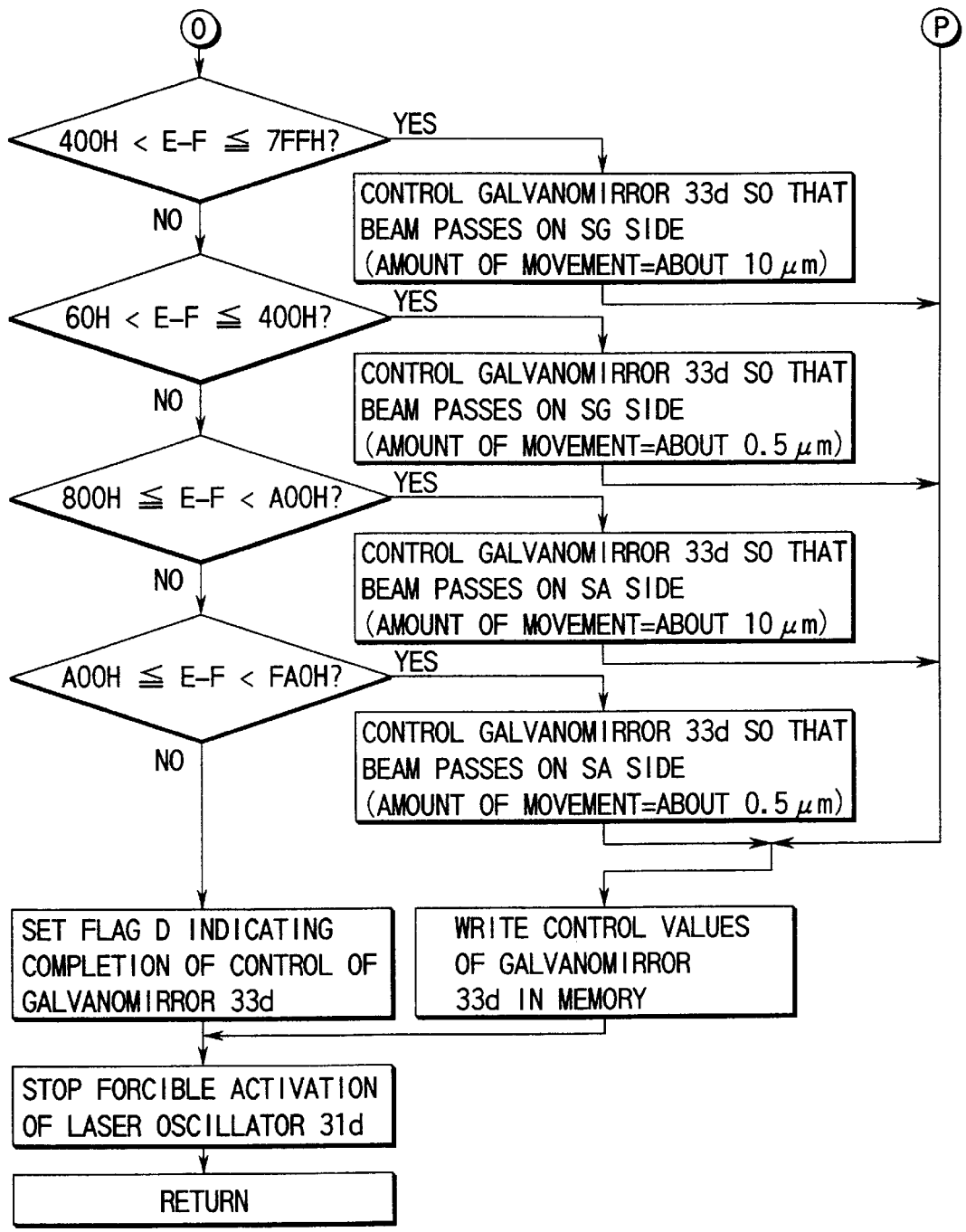
FIG. 31 is a flow chart illustrating a light beam passing position control routine.
Figure 32A:
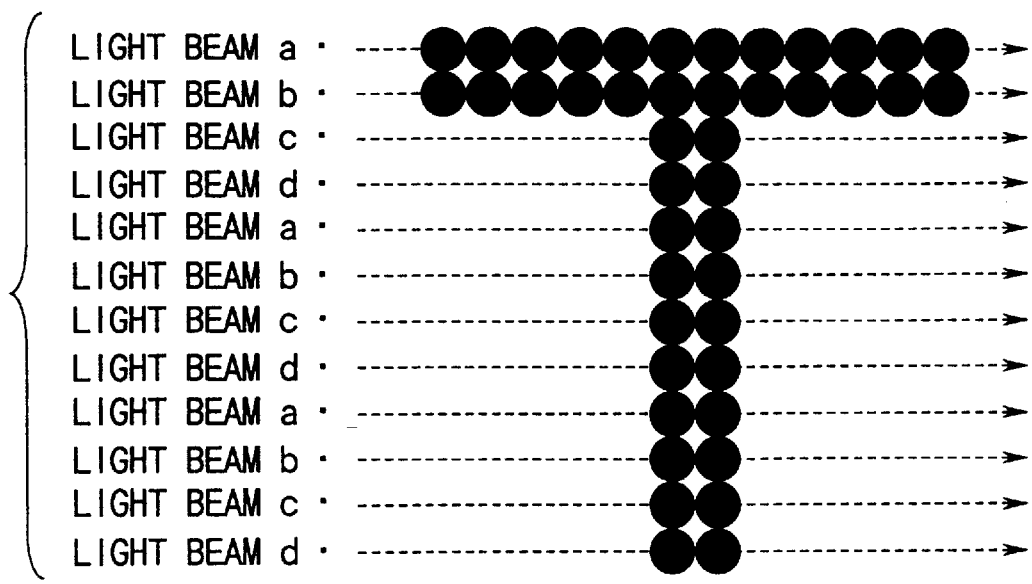
FIGS. 32A and 32B illustrate an image defect occurring when an image is formed by using a dislocated light beam.
Figure 32B:
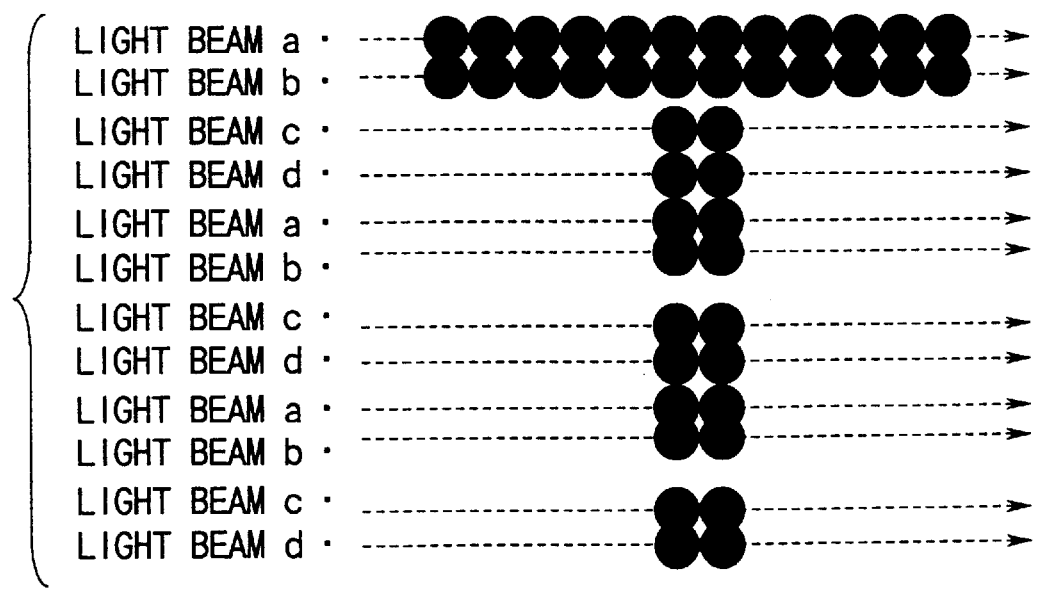
Figure 33A:
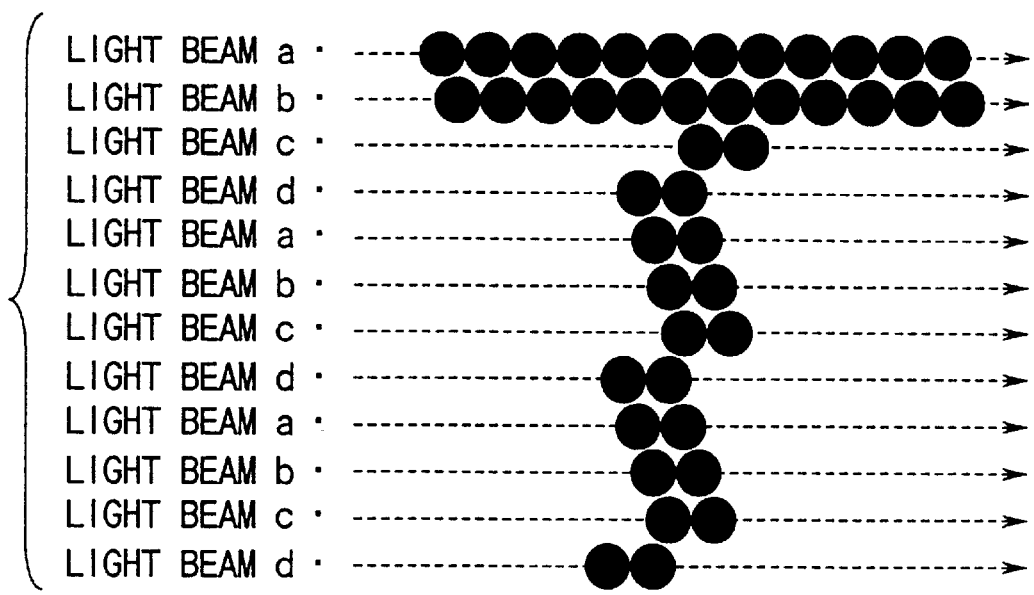
FIGS. 33A and 33B illustrate an image defect occurring when an image is formed by using a dislocated light beam.
Figure 33B:
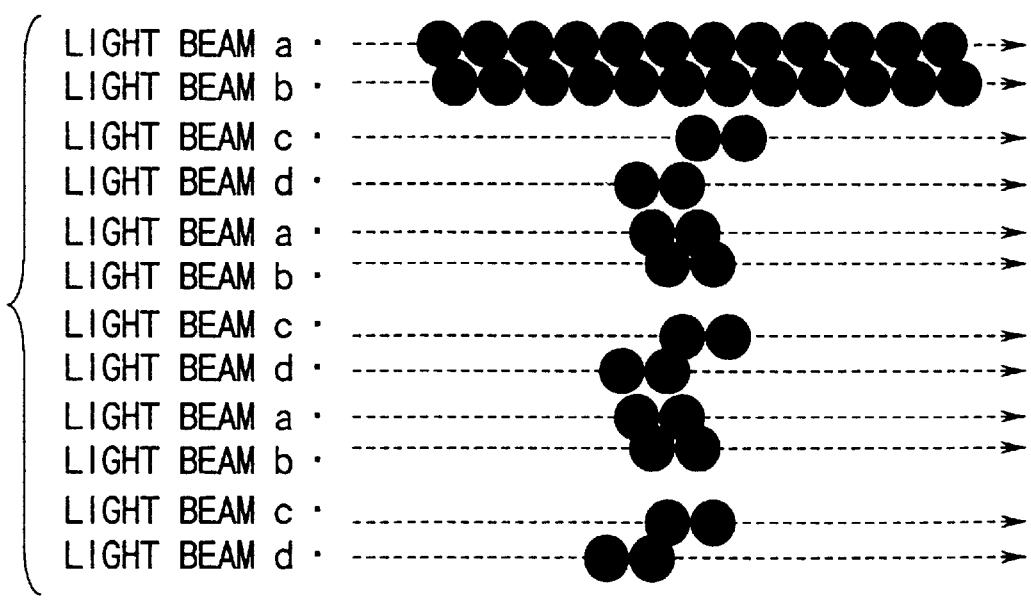

FIGS. 24 and 25 are flow charts illustrating in detail the operations in step S22 in FIG. 15 in connection with the system shown in FIG. 8. That is, FIGS. 24 and 25 are flow charts for describing the passing position control of the light beam a in the case of using the system shown in FIG. 8. As has been described above, FIG. 11 shows the relationship between the beam passing position and the A/D conversion output in the system of FIG. 8. Thus, FIG. 11 will also be referred to.

At first, the main control unit 51 forcibly activates the laser oscillator 31a to emit light (S701). Thereby, the light beam a is made to cyclically scan over the beam position detector 38 by the rotation of the polygon mirror 35.

The main control unit 51 then reads A/D converted values of the outputs from each amplifier and differential amplifier in accordance with interrupt signals (INT) output from the A/D converter 43. As has been described above, in general, the scan positions of light beams slightly vary, depending on the respective surfaces of the polygon mirror 35, because of inclinations of the surfaces. In order to eliminate the influence of the inclinations of the surfaces of the polygon mirror 35, it is desirable to read A/D converted values a number of times corresponding to the number of surfaces of polygon mirror 35 or an integer number of times of the number of surfaces of polygon mirror 35. The main control unit 51 averages output values from the A/D converter 43 corresponding to the respective amplifiers and differential amplifiers, and recognizes the averaged result as the outputs of the amplifiers and differential amplifiers (S702). Accordingly, if the output values from the A/D converter 43 are read a number of times corresponding to the number (8) of surfaces of polygon mirror 35 with respect to the amplifiers A and G and differential amplifiers B-C, C-D, D-E and E-F, it is necessary to make the light beams scan 48 times.

The main control unit 51 determines whether the obtained output of the amplifier A is greater than 100H (S703).

If the output from the amplifier A is greater than 100H, it is found that the passing position of the beam a is on the sensor pattern A or closest to the sensor pattern A. In other words, it is found that the light beam a passes over the area A in FIG. 11. Since the target passing position of the beam a is at the middle between the sensor patterns SB and SC, the galvanomirror 33a is controlled so that the light beam a may pass on the sensor pattern SG side (S704).

The control amount (the amount of movement of the beam) in this case is set at about 120 μm. The reason is that the sensor patterns A and G are large patterns located on both sides of the area of control target points, as described with reference to FIGS. 3 and 4, and the beam passing position needs to be altered to a relatively great degree while the beam is passing over the sensor patterns A and G, in order to approach the beam passing position to the target point as quickly as possible. Even when the output of the amplifier A is greater than 100H, if the light beam a is passing over a point near the sensor pattern SB, the beam passing position may be altered excessively. However, in consideration of the total efficiency, the amount of movement of such a degree is necessary.

If it is-determined in step S703 that the output of the amplifier A is not greater than 100H, it is then determined whether the output of the amplifier G is greater than 100H (S705). The outputs from the sensor patterns A and G located at opposite ends are first examined for the reason described with reference to FIG. 16. In addition, however, there is the following reason. In the case of the embodiment using the structure shown in FIG. 8, when the beam passing position is far from the target position, the output of the differential amplifier (differential amplifier B-C in this case) corresponding to the target position is almost zero. Consequently, it may be erroneously detected that the light beam is passing over the target position. In order to prevent such erroneous detection, the general position of the light beam is first detected.

If the output from the amplifier G is greater than 100H, it is found that the passing position of the beam a is on the sensor pattern G or closest to the sensor pattern G. In other words, it is found that the light beam a passes over the area G in FIG. 11. In this case, the galvanomirror 33a is controlled so that the light beam a may pass on the sensor pattern SA side and may approach the middle point between the sensor patterns SB and SC, which is the target passing position of the beam a (S706). The control amount (amount of movement) in this case needs to be about 120 μm, like the control in step S704.

Figure 11:
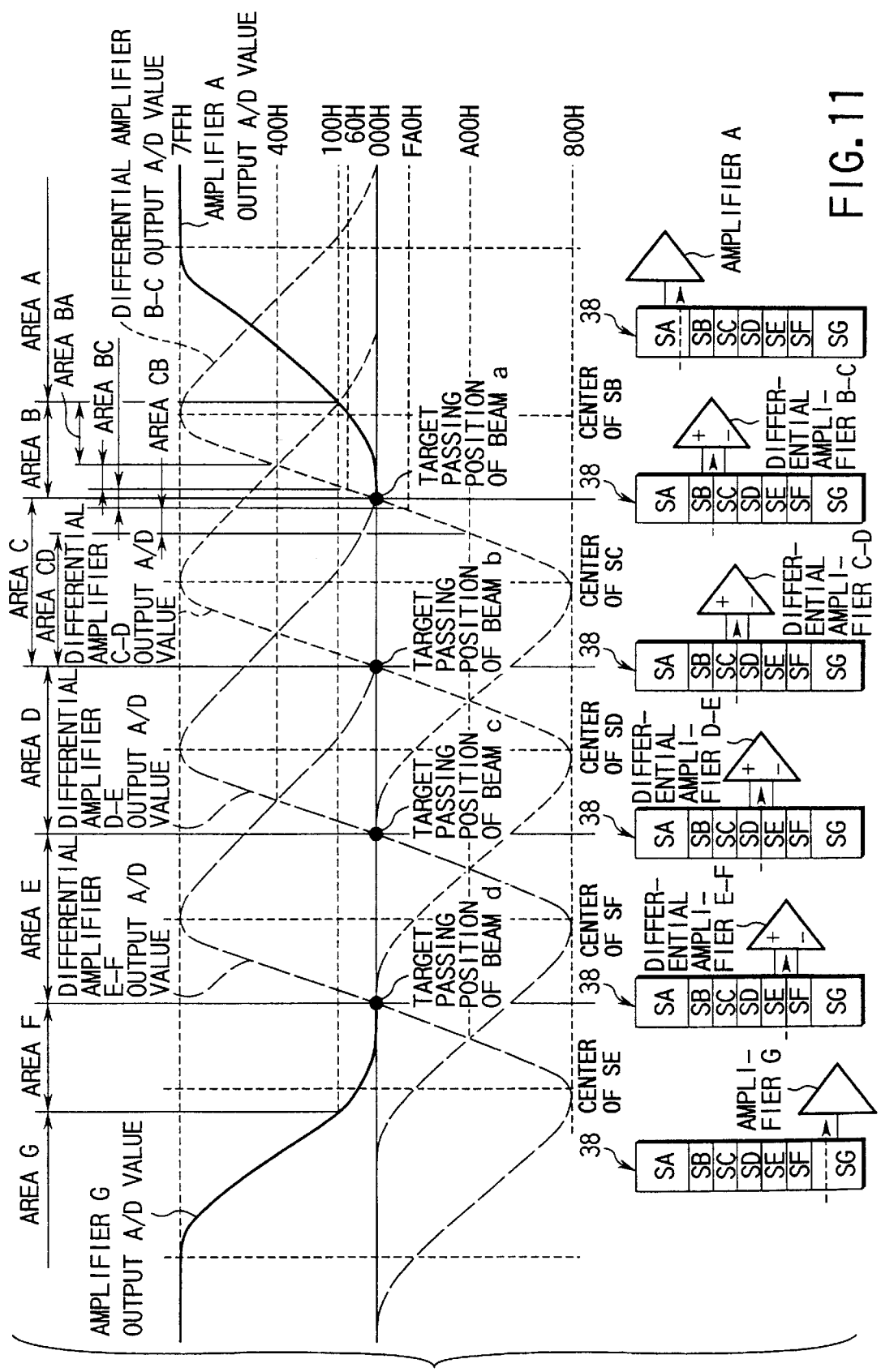
FIG. 11 is a graph showing a relationship between the light beam passing position and the output of the A/D converter.

When it is determined in step S705 that the output from the amplifier G is not greater than 100H, the main control unit 51 determines whether the output value of the differential amplifier E-F (i.e. A/D conversion value) is 800H or more, that is, whether the output of the differential amplifier E-F has a negative value in the graph of FIG. 11 (S707).

If the output value of the differential amplifier E-F (i.e. A/D conversion value) is 800H or more, it is found that the passing position of the beam a is near the sensor pattern F. In other words, it is found that the light beam a passes over the area F in FIG. 11. In this case, the galvanomirror 33a is controlled so that the light beam a may pass on the sensor pattern SA side and may approach the middle point between the sensor patterns SB and SC, which is the target passing position of the beam a (S708). The control amount (amount of movement) in this case needs to be about 120 μm, in consideration of the distance between the target point and the area F.

When it is determined in step S707 that the output value of the differential amplifier E-F (i.e. A/D conversion value) is not 800H or more, the main control unit 51 determines whether the output value of the differential amplifier D-E (i.e. A/D conversion value) is 800H or more (S709).

If the output value of the differential amplifier D-E (i.e. A/D conversion value) is 800H or more, it is found that the passing position of the beam a is near the sensor pattern E. In other words, it is found that the light beam a passes over the area E in FIG. 11. In this case, the galvanomirror 33a is controlled so that the light beam a may pass on the sensor pattern SA side and may approach the middle point between the sensor patterns SB and SC, which is the target passing position of the beam a (S710). The control amount (amount of movement) in this case needs to be about 80 μm, in consideration of the distance between the target point and the area E.

When it is determined in step S709 that the output value of the differential amplifier D-E (i.e. A/D conversion value) is not 800H or more, the main control unit 51 determines whether the output value of the differential amplifier C-D (i.e. A/D conversion value) is 800H or more (S711).

If the output value of the differential amplifier C-D (i.e. A/D conversion value) is 800H or more, it is found that the passing position of the beam a is near the sensor pattern D. In other words, it is found that the light beam a passes over the area D in FIG. 11. In this case, the galvanomirror 33a is controlled so that the light beam a may pass on the sensor pattern SA side and may approach the middle point between the sensor patterns SB and SC, which is the target passing position of the beam a (S712). The control amount (amount of movement) in this case needs to be about 40 μm, in consideration of the distance between the target point and the area D.

When it is determined in step S711 that the output value of the differential amplifier C-D (i.e. A/D conversion value) is not 800H or more, the main control unit 51 determines whether the output value of the differential amplifier B-C (i.e. A/D conversion value) is greater than 400H and is 7FFH or less (S713).

If the output value of the differential amplifier B-C (i.e. A/D conversion value) is greater than 400H and is 7FFH or less, it is found that the passing position of the beam a is near the middle point between the sensor patterns SB and SC, which is the target passing position, but slightly deviates towards the sensor pattern SB. In other words, it is found that the light beam a passes over the area BA in area B. In this case, the galvanomirror 33a is controlled so that the light beam a may pass on the sensor pattern SG side and may approach the middle point between the sensor patterns SB and SC, which is the target passing position of the beam a (S714). The control amount (amount of movement) in this case needs to be about 10 μm, in consideration of the distance between the target point and the area D.

When it is determined in step S713 that the output value of the differential amplifier B-C (i.e. A/D conversion value) is neither greater than 400H nor 7FFH or less, the main control unit 51 determines whether the output value of the differential amplifier B-C (i.e. A/D conversion value) is greater than 60H and is 400H or less (S715).

If the output value of the differential amplifier B-C (i.e. A/D conversion value) is greater than 60H and is 400H or less, it is found that the passing position of the beam a is near the middle point between the sensor patterns SB and SC, which is the target passing position, but slightly deviates towards the sensor pattern SB. In other words, it is found that the light beam a passes over the area BC in area B. In this case, the galvanomirror 33a is controlled so that the light beam a may pass on the sensor pattern SG side and may approach the middle point between the sensor patterns SB and SC, which is the target passing position of the beam a (S716). The control amount (amount of movement) in this case needs to be about 0.5 μm, in consideration of the distance between the target point and the area D.

When it is determined in step S715 that the output value of the differential amplifier B-C (i.e. A/D conversion value) is neither greater than 60H nor 400H or less, the main control unit 51 determines whether the output value of the differential amplifier B-C (i.e. A/D conversion value) is greater than 800H and is A00H or less (S717).

If the output value of the differential amplifier B-C (i.e. A/D conversion value) is greater than 800H and is A00H or less, it is found that the passing position of the beam a is near the middle point between the sensor patterns SB and SC, which is the target passing position, but slightly deviates towards the sensor pattern SC. In other words, it is found that the light beam a passes over the area CD in area C. In this case, the galvanomirror 33a is controlled so that the light beam a may pass on the sensor pattern SA side and may approach the middle point between the sensor patterns SB and SC, which is the target passing position of the beam a (S718). The control amount (amount of movement) in this case needs to be about 10 μm, in consideration of the distance between the target point and the area D.

When it is determined in step S717 that the output value of the differential amplifier B-C (i.e. A/D conversion value) is neither greater than 800H nor A00H or less, the main control unit 51 determines whether the output value of the differential amplifier B-C (i.e. A/D conversion value) is greater than A00H and is FA0H or less (S719).

If the output value of the differential amplifier B-C (i.e. A/D conversion value) is greater than A00H and FA0H or less, it is found that the passing position of the beam a is near the middle point between the sensor patterns SB and SC, which is the target passing position, but sligthly deviates towards the sensor pattern SC. In other words, it is found that the light beam a passes over the area CB in area C. In this case, the galvanomirror 33a is controlled so that the light beam a may pass on the sensor pattern SA side and may approach the middle point between the sensor patterns SB and SC, which is the target passing position of the beam a (S720). The control amount (amount of movement) in this case needs to be about 0.5 μm, in consideration of the distance between the target point and the area CB.

When it is determined in step S719 that the output value of the differential amplifier B-C (i.e. A/D conversion value) is neither greater than A00H nor FA0H or less, it is found that the passing position of the beam a is within the prescribed range (±1 μm from the target point). Thus, the main control unit 51 sets the control completion flag A for the galvanomirror 33a (S721).

When the light beam a does not pass within the range of ±1 μm from the ideal passing point (steps S704, S706, S708, S710, S712, S714, S716, S718, S720), the main control unit 51 controls the galvanomirror 33a by a predetermined amount and writes the control amount in the memory 52 (S722).

As has been described above, the main control unit 51 sets the control completion flag A indicating the completion of control of the galvanomirror 33*a* when the beam a passes within the range of +1 µm from the ideal passing point. When the beam a does not pass within the range of ±1 µm from the ideal passing point, the main control unit 51 sets the galvanomirror control amount in accordance with the beam passing position (area) and writes the control amount in the memory 52.

Then, the main control unit 51 stops the forcible activation of the laser oscillator 31*a* and completes the series of the control operations for the passing position of the beam a (S723).

As has already been described with reference to FIG. 15, when the control completion flag A for the galvanomirror 33*a* is not set, the passing position control routine for the beam a is executed once again. In other words, this routine is repeated until the beam a passes within the range of ±1 µm from the ideal passing point.

FIGS. 26 to 31 are flow charts illustrating the control operations for the light beams b to d. Although a detailed description of the respective control operations is omitted, these control operations are basically the same as the control operation for the light beam a. The laser oscillators 31*b* to 31*d* are forcibly activated, and the outputs from the amplifiers A and G and differential amplifiers B-C, C-D, D-E and E-F are determined. If the beam passing positions are within the range of ±1 µm from the ideal control point, the control completion flags B to D indicating the completion of the control of galvanomirrors 33*b* to 33*d* are set up. If the beam passing positions are not within this range, it is determined over which areas the light beams (b to d) are passing and the galvanomirrors 33*b* to 33*d* are controlled according to the determined areas. The control values in this case are written in the memory 52.

According to the above-described embodiment, the beam position detector having the above-described sensor patterns are used. Thereby, the scan positions of the light beams can be exactly detected even if the precision in mounting angle of the beam position detector is not high.

In the digital copying machine using the multi-beam optical system, the passing positions of light beams are detected by the beam position detector situated on a level with the surface of the photosensitive drum. Based on the detected result, control amounts for optimally controlling the relative positions of the beams on the surface of the photosensitive drum are calculated. Based on the calculated control amounts, the galvanomirrors are controlled to alter the relative positions of the beams on the surface of the photosensitive drum. Thereby, the positional relationship among the light beams on the surface of the photosensitive drum can be optimally controlled with no particular precision or adjustment for the assembly of the optical system, even if some change occurs in the structure of the optical system due to a variation in ambience or a variation with the passing of time. Therefore, high image quality can be maintained at all times.

In the above-described embodiment, the present invention is applied to the digital copying machine using the multi-beam optical system. However, this invention is also applicable to various image forming apparatus other than the digital copying machine, for example, a high-speed printer, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scan apparatus comprising:

light beam generating means for generating a light beam;

scan means for reflecting the light beam, generated by the light beam generating means, to both a scan surface and a plurality of light detection means, and for scanning both the scan surface and the plurality of light detection means with the light beam in a main scan direction;

the plurality of light detection means, arranged near the scan surface and in the sub-scan direction, for receiving the light beam reflected and scanned by the scanning means, and outputting a corresponding signal;

position determination means for determining, on the basis of the signal output from the light detection means, the position in the sub scan direction of the light beam scanned by the scan means; and control means for controlling the position in the sub-scan direction of the light beam scanned by the scan means on the scan surface at a predetermined position, on the basis of the determination result of the position determination means.

2. The apparatus according to claim 1, wherein each of the light detection means has such a shape that the dimension in the main scan direction of the light beams is greater than the dimension in the sub-scan direction of the beams.

3. The apparatus according to claim 2, wherein the light detection means are arranged in parallel at regular intervals in the sub-scan direction of the light beam.

4. The apparatus according to claim 1, wherein the plurality of light detection means comprise a plurality of first light detection means arranged at regular intervals in the sub-scan direction of the light beam, and two second light detection means arranged outside both ends of the first light detection means in the sub-scan direction, and each of the second light detection means is greater in size than each of the first light detection means.

5. The apparatus according to claim 4, wherein said position determination means includes means for first determining whether an output signal from the second light detection means is greater than an output signal from the other light detection means among said plurality of light detection means.

6. The apparatus according to claim 1, further comprising first and second light beam passing detection means, arranged outside both ends of the plurality of light detection means in the main scan direction, for detecting the passing of the light beam scanned by the scan means, wherein said position determination means includes integration means for integrating signals output from the plurality of light detection means, after the passing of the light beams is detected by the first light beam passing detection means, and said control means includes means for controlling the position in the sub-scan direction of the light beam scanned by the scan means on the scan surface, on the basis of an integration value obtained by the integration means.

7. The apparatus according to claim 6, wherein said integration means starts an integration operation after resetting the integration value by means of an output of the first light beam passing detection means.

8. The apparatus according to claim 6, wherein said position determination means includes A/D conversion means for A/D converting the integration value in accordance with an output signal from the second light beam passing detection means.

9. The apparatus according to claim 1, further comprising first and second light beam passing detection means, arranged outside both ends of the plurality of light detection means in the main scan direction, for detecting the passing of the light beam scanned by the scan means, wherein said position determination means includes (a) a plurality of differential amplification means for differential-amplifying outputs from adjacent two of the light detection means, and (b) integration means for integrating outputs from the differential amplifiers after the passing of the light beam has been detected by the first light beam passing detection means, and said control means includes means for controlling the position in the sub-scan direction of the light beam scanned by the scan means on the scan surface, on the basis of an integration value obtained by the integration means.

10. A light beam scan apparatus comprising:

a plurality of light beam generating means for generating light beams;

scan means for reflecting the light beams, generated by the plural light beam generating means, to a scan surface to be scanned, and for scanning the scan surface in a main scan direction and a sub-scan direction by means of the light beams;

a plurality of light detection means for receiving the light beams and outputting corresponding signals, said light detection means being arranged near the scan surface and in the sub-scan direction, such that gaps between adjacent two of the light detection means coincide with target positions of the light beams in the sub-scan direction;

selection means for selecting one of the light beam generating means and causing the selected one to emit one light beam;

position determination means for determining, on the basis of the signals output from the light detection means, the position in the sub-scan direction of said one light beam selected by the selection means and scanned by the scan means; and control means for controlling the scan means such that the light beams scanned by the scan means pass over the target positions, on the basis of the determination result of the position determination means.

11. The apparatus according to claim 10, wherein the number of said plural light detection means is greater than that of said plural light beam generating means.

12. The apparatus according to claim 10, wherein the number of gaps each provided between adjacent two of the light detection means is equal to the number of said plural light beam generating means.

13. The apparatus according to claim 10, wherein the plurality of light detection means comprise a plurality of first light detection means arranged at-regular intervals in the sub-scan direction of the light beam, and two second light detection means arranged outside both ends of the first light detection means in the sub-scan direction, and each of the second light detection means is greater in size than each of the first light detection means.

14. The apparatus according to claim 13, wherein said position determination means includes means for first determining whether an output signal from the second light detection means is greater than an output signal from the other light detection means among said plurality of light detection means.

15. An image formation apparatus comprising:

scanner means for optically scanning an original and providing image data corresponding to the original;

a plurality of light beam generating means for generating light beams corresponding to the image data from the scanner means;

an image carrying body for forming an electrostatic latent image by radiation of the light beams from the light beam generating means;

scan means for reflecting the light beams, generated by the plural light beam generating means, to a scan surface to be scanned on said image carrying body, and for scanning the scan surface in a main scan direction and a sub-scan direction by means of the light beams;

scan position control means including (a) a plurality of light detection means for receiving the light beams and outputting corresponding signals, said light detection means being arranged near the scan surface and in the sub-scan direction, such that gaps between adjacent two of the light detection means coincide with target positions of the light beams in the sub-scan direction, (b) selection means for selecting one of the light beam generating means and causing the selected one to emit one light beam, (c) position determination means for determining, on the basis of the signals output from the light detection means, the position in the sub-scan direction of said one light beam selected by the selection means and scanned by the scan means, and (d) control means for controlling the scan means such that the light beams scanned by the scan means pass over the target positions, on the basis of the determination result of the position determination means;

developing means for developing the electrostatic latent image formed on the image carrying body; and transfer means for transferring an image developed by the developing means onto a paper sheet.

16. The apparatus according to claim 15, wherein said scan position control means includes means for performing a passing position control for the plural light beams in every image forming operation.

17. A light beam scanning apparatus comprising:

light beam generating means for generating a light beam;

scanning means for reflecting the light beam, generated from the light beam generating means, onto a scan surface to be scanned, and scanning the scan surface in a main scan direction by means of the light beam;

a plurality of light detection means, arranged near the scan surface and in parallel to a sub-scan direction perpendicular to the main scan direction, for receiving the light beam from the light beam generating means and outputting a corresponding signal;

position determination means for determining a position in the sub-scan direction of the light beam scanned by the scanning means, on the basis of the signal output from the light detection means;

moving means for moving, to a predetermined position, the position in the sub-scan direction of the light beam scanned by the scanning means on the scan surface, on the basis of a determination result obtained by the position determination means; and control means for instructing the position determination means to determine once again the position in the sub-scan direction of the light beam scanned by the scanning means, after a predetermined time period has passed since the moving means moved the position in the sub-scan direction of the light beam scanned by the scanning means on the scan surface.

18. The apparatus according to claim 17, wherein the moving means comprises a galvanomirror, and the control means instructs the position determination means to determine once again the position in the sub-scan direction of the light beam scanned by the scanning means, after a time period enough to reduce oscillation of the galvanomirror has passed since the galvanomirror moved the position in the sub-scan direction of the light beam scanned by the scanning means on the scan surface.

19. A light beam scanning apparatus comprising:

a plurality of light beam generating means for generating light beams;

scanning means for reflecting the light beams, generated from the light beam generating means, onto a scan surface to be scanned, and scanning the scan surface in a main scan direction by means of the light beams;

a plurality of light detection means, arranged near the scan surface and in parallel to a sub-scan direction perpendicular to the main scan direction, for receiving the light beams from the light beam generating means and outputting corresponding signals;

position determination means for determining positions in the sub-scan direction of the light beams scanned by the scanning means, on the basis of the signals output from the light detection means;

moving means for moving the positions in the sub-scan direction of the light beams scanned by the scanning means on the scan surface, on the basis of a detection result obtained by the position determination means; and control means for performing a control such that first light beam generating means of said plurality of light beam generating means is driven to generate a first light beam, the position determination means determines a position in the sub-scan direction of the first light beam on the scan surface, and the position in the sub-scan direction of the first beam on the scan surface is moved by the moving means on the basis of a determination result obtained by the position determination means; and thereafter second light beam generating means of said plurality of light beam generating means is driven to generate a second light beam, the position determination means determines a position in the sub-scan direction of the second light beam on the scan surface, and the position in the sub-scan direction of the second beam on the scan surface is moved by the moving means on the basis of a determination result obtained by the position determination means, following which the first beam generating means is driven once again to generate a first beam and the position determination means determines a position in the sub-scan direction on the scan surface.

20. A light beam scan method comprising the steps of:

generating a light beam;

reflecting the light beam onto both a scan surface and a plurality of light detection sensors with use of a beam scan device, and scanning both the scan surface and the plurality of light detection sensors with the light beam in a main scan direction;

receiving the light beam reflected and scanned by the scanning device with use of the plurality of light detection sensors arranged near the scan surface and in the sub-scan direction, and outputting a corresponding signal;

determining the position in the sub-scan direction of the light beam scanned by the scan device, on the basis of the signal output from said plurality of light detection sensors; and controlling the position in the sub-scan direction of the light beam on the scan surface at a target position, on the basis of the determination result acquired in the position determination step.

21. A light beam scan method comprising the steps of:

generating a plurality of light beams;

reflecting the light beams onto a scan surface with use of a beam scan device, and scanning the scan surface in a main scan direction and a sub-scan direction with said light beams;

(a) generating one of said plurality of light beams;

(b) receiving the light beam and outputting a corresponding signal with use of a plurality of light sensors arranged near the scan surface and in the sub-scan direction, such that gaps between adjacent two of the light sensors coincide with target positions of the light beams in the sub-scan direction;

(c) determining, on the basis of the signals output from the light sensors, the position in the sub-scan direction of said one light beam scanned by the beam scan device;

(d) controlling the beam scan device such that the light beam scanned by the beam scan device passes over the target position, on the basis of the determination result acquired in the position determination step; and executing said steps (a) to (d) for remaining ones of said plurality of light beams.

22. An image formation method comprising the steps of:

optically scanning an original with use of an original scanner and providing image data corresponding to the original;

generating a plurality of light beams corresponding to the image data provided by the original scanner;

reflecting said light beams onto a scan surface on an image carrying body with use of a beam scan device, scanning the scan surface in a main scan direction and a sub-scan direction by means of the light beams, and forming an electrostatic latent image on the image carrying body;

controlling a scan position, said scan position controlling step including:

(a) generating one of said light beams;

(b) receiving the light beam and outputting a corresponding signal by means of a plurality of light sensors arranged near the scan surface and in the sub-scan direction, such that gaps between adjacent two of the light sensors coincide with target positions of the light beams in the sub-scan direction;

(c) determining, on the basis of the signals output from the light sensors, the position in the sub-scan direction of said one light beam scanned by the beam scan device;

(d) controlling the beam scan device such that the light beam scanned by the beam scan device passes over the target position, on the basis of the determination result acquired in the position determination step;

(e) executing said steps (a) to (d) for remaining ones of said plurality of light beams;

developing the electrostatic latent image formed on the image carrying body; and transferring the developed image obtained in the developing step onto a paper sheet.

23. A light beam scan method comprising the steps of:

generating a light beam;

reflecting the light beam onto a scan surface with use of a beam scan device, and scanning the scan surface in a main scan direction by means of the light beam;

receiving the light beam and outputting corresponding signals with use of a plurality of light sensors arranged near the scan surface and in parallel to a sub-scan direction perpendicular to the main scan direction;

determining a position in the sub-scan direction of the light beam scanned by the beam scan device, on the basis of the signals output from the light sensors;

moving with use of the beam scan device a position in the sub-scan direction of the light beam scanned by the beam scan means on the scan surface, to a predetermined position on the basis of a determination result obtained in the position determination step; and determining once again the position in the sub-scan direction of the light beam scanned by the beam scan device, after a predetermined time period has passed since the beam scan device moved the position in the sub-scan direction of the light beam scanned by the beam scan device on the scan surface.

24. A light beam scan method comprising the steps of:

generating a plurality of light beams;

reflecting the light beams onto a scan surface with use of a beam scan device, and scanning the scan surface in a main scan direction;

generating a first beam of said plurality of light beams;

receiving the first light beam and outputting corresponding signals, by means of a plurality of light sensors arranged near the scan surface and in parallel to a sub-scan direction perpendicular to the main scan direction;

determining a position in the sub-scan direction of said first beam on the scan surface, on the basis of the signals output from the light sensors, and moving with use of the beam scan device a position in the sub-scan direction of the first light beam on the scan surface, to a target position on the basis of a determination result;

generating a second light beam of said plurality of light beams, and determining a position in the sub-scan direction of the second light beam on the scan surface on the basis of the signals output from the light sensors;

moving with use of the beam scan device a position in the sub-scan direction of the second light beam on the scan surface, to a target position on the basis of a determination result obtained in the preceding determination step; and generating the first light beam once again, and determining the position in the sub-scan direction of the first light beam on the scan surface.

\* \* \* \* \*